United States Patent
Iida

(10) Patent No.: US 9,684,617 B2
(45) Date of Patent: Jun. 20, 2017

(54) BUS RELAY DEVICE FOR RELAYING COMMUNICATION THROUGH BUS OF I/O APPARATUS AND CPU WHEREIN RELAY DEVICE HAS LOWER SIDE TRANSMISSION UNIT TO TRANSMIT INTERRUPT FACTOR ADDRESS

(71) Applicant: MITSUBISHI ELECTRIC CORPORATION, Tokyo (JP)

(72) Inventor: Hiroyuki Iida, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 119 days.

(21) Appl. No.: 14/780,918

(22) PCT Filed: May 16, 2013

(86) PCT No.: PCT/JP2013/063709
§ 371 (c)(1),
(2) Date: Sep. 28, 2015

(87) PCT Pub. No.: WO2014/184935
PCT Pub. Date: Nov. 20, 2014

(65) Prior Publication Data
US 2016/0055109 A1 Feb. 25, 2016

(51) Int. Cl.
*G06F 13/00* (2006.01)
*G06F 13/34* (2006.01)
*G06F 13/24* (2006.01)
*G06F 13/42* (2006.01)

(52) U.S. Cl.
CPC .............. *G06F 13/34* (2013.01); *G06F 13/24* (2013.01); *G06F 13/4282* (2013.01)

(58) Field of Classification Search
CPC ....... G06F 13/34; G06F 13/24; G06F 13/4282
See application file for complete search history.

(56) References Cited

U.S. PATENT DOCUMENTS

| 5,748,909 | A | 5/1998 | Nakabayashi | |
|---|---|---|---|---|
| 2007/0283067 | A1* | 12/2007 | Patella | G06F 13/24 710/260 |
| 2013/0166805 | A1* | 6/2013 | Osagawa | G06F 13/24 710/267 |

FOREIGN PATENT DOCUMENTS

| JP | 1-306948 A | 12/1989 |
|---|---|---|
| JP | 2-166548 A | 6/1990 |
| JP | 5-257863 A | 10/1993 |
| JP | 8-115292 A | 5/1996 |
| JP | 11-338713 A | 12/1999 |
| JP | 2000-276357 A | 10/2000 |

(Continued)

*Primary Examiner* — Tammara Peyton
(74) *Attorney, Agent, or Firm* — Birch, Stewart, Kolasch & Birch, LLP

(57) ABSTRACT

A relaying device, when having received an interrupt notification 151 from an I/O device, transmits an interrupt factor read request 159(1) for an interrupt factor to the I/O device, based on an address information memory table 1041, without waiting for a response from a CPU, and transmits the interrupt notification 151 received, to the CPU. When having received an interrupt factor 160(1), the relaying device transmits an intra-I/O-device data read request 159(2) to the I/O device, based on an intra-I/O-device data read address storing table 1081, without waiting for a response from the CPU.

8 Claims, 22 Drawing Sheets

(56) References Cited

FOREIGN PATENT DOCUMENTS

| JP | 2010-224689 A | 10/2010 |
| JP | 2011-175419 A | 9/2011 |

* cited by examiner

Fig. 5

ADDRESS INFORMATION MEMORY TABLE (IN INTERRUPT FACTOR ADDRESS MEMORY PART 104) — 1041

| No. | STATUS | CONNECTION PORT NUMBER | TRANSMISSION ADDRESS | ACCESS HISTORY | ACCESS COUNT |
|---|---|---|---|---|---|
| 1 | VALID | 0 | 1000 | 2 | 5 |
| 2 | VALID | 0 | 1010 | 1 | 3 |
| 3 | VALID | 0 | 1020 | 0 | 0 |
| 4 | VALID | 1 | 2000 | 0 | 0 |
| ⋮ | ⋮ | ⋮ | ⋮ | ⋮ | ⋮ |
| n | INVALID | | | | |

INTRA-I/O-DEVICE DATA READ ADDRESS MEMORY TABLE (IN INTRA-I/O-DEVICE DATA READ ADDRESS MEMORY PART 108) — 1081

| No. | STATUS | TRANSMISSION ADDRESS | INTERRUPT FACTOR CONTENT | INTRA-I/O-DEVICE DATA READ ADDRESS |
|---|---|---|---|---|
| 1 | VALID | 1020 | 1 | 2120 |
| 2 | VALID | 1020 | 2 | 2220 |
| 3 | VALID | 1000 | 1 | 2100 |
| ⋮ | ⋮ | ⋮ | ⋮ | ⋮ |
| n | INVALID | | | |

1081-1  1081-2  1081-3  1081-4  1081-5

BUS RELAY DEVICE FOR RELAYING COMMUNICATION THROUGH BUS OF I/O APPARATUS AND CPU WHEREIN RELAY DEVICE HAS LOWER SIDE TRANSMISSION UNIT TO TRANSMIT INTERRUPT FACTOR ADDRESS

TECHNICAL FIELD

The present invention relates to a bus relaying device that relays communication via a bus between an I/O device and a CPU concerning an interruption to the I/O device.

BACKGROUND ART

Known are a system that executes a software process periodically and repeatedly, and a configuration for the same. According to this system, a CPU performs the software process and completes the software process within a predetermined period of time. The CPU performs a software process again in the next period. In the configuration of this system, a plurality of I/O devices are connected to the CPU via a bus relaying device (bridge). In a connection of the I/O devices and the bus relaying device, or in a bus configuration of 1-to-1 (point-to-point) connection, the following processes (1) and (2) are performed.

(1) An I/O device notifies the CPU of an interruption via the bus relaying device.

(2) The CPU issues an "interrupt factor" read request. The "interrupt factor" read request issued by the CPU reaches the I/O device via the bus relaying device.

In this case, when reading the "interrupt factor" from the I/O device, the process by the CPU is in an "interrupt factor" reading wait state since the time the CPU issues the "interrupt factor" read request until the CPU receives the "interrupt factor".

According to the following patent reference 1 (JP 5-257863), a bus relaying device equivalent portion reads an interrupt factor on behalf of a CPU, so that the time taken until the CPU acquires the interrupt factor is shortened. In patent reference 1, when an interrupt notification is accepted from an I/O device, the bus relaying device equivalent portion (ISR read sequence part 41) in a processing unit reads the interrupt factor.

Hence, the bus relaying device equivalent portion reads the interrupt factor on behalf of the CPU, so that the time taken until the CPU acquires the interrupt factor is shortened.

However, before the CPU acquires the interrupt factor, the bus relaying device equivalent portion (ISR read sequence part 41) must know a read address. This address need be set in the bus relaying device equivalent portion in advance. If the read address of the interrupt factor is fixed, a system whose address is other than the fixed address cannot be coped with. If the address of the interrupt factor differs between systems, corresponding addresses need be set in the bus relaying device equivalent portion (ISR read sequence part 41) in advance. In the configuration of patent reference 1, software-manner address setting is necessary at the time of initialization. In addition, if the CPU having read the content needs to read data in the I/O device depending on the content, the wait time for reading the data in the I/O device cannot be shortened. Furthermore, in patent reference 1, the I/O device and the bus relaying device equivalent portion are connected by an intra-device bus. This cannot cope with a multistage bus configuration.

CITATION LIST

Patent Literature

Patent Literature 1: JP 05-257863A

SUMMARY OF INVENTION

Technical Problem

A conventional method that shortens the time taken for reading the "interrupt factor" has the following problems.

(1) An address indicating the storing location of the "interrupt factor" need be set in advance. This address setting must be performed in a software manner at the time of initialization.

(2) Relating to a process performed by the CPU due to the interrupt factor, when reading the data in the I/O device, the time taken for reading the data in the I/O device cannot be shortened.

(3) Also, the conventional method cannot cope with a multistage bus configuration in which bus relaying devices are connected by multistage connection.

The present invention has been made to solve the above problems and can achieve the following features.

(1) An address indicating the storing location of the "interrupt factor" need not be set in advance, and accordingly it is not necessary to modify a software process employed prior to the conventional method of shortening the time taken for reading the "interrupt factor".

(2) Relating to reading data in the I/O device, which occurs in a process after interrupt factor reading, the time taken for reading the data is shortened.

(3) A multistage bus configuration can be coped with in which bus relaying devices are connected by multistage connection in order that as many as possible I/O devices can be connected.

It is an object of the present invention to shorten the process concerning the interrupt factor by the above features, so that more time can be spent on a periodical software process.

Solution to Problem

A bus relaying device according to the present invention which relays interrupt information communicated between a CPU (Central Processing Unit) and an I/O (input/Output) device, an upper-order side of the bus relaying device being connected to either the CPU or another relaying device, a lower-order side of the bus relaying device being connected to at least the I/O device, out of the I/O device and still another relaying device different from the relaying device connected to the upper-order side, includes:

an interrupt notification receiving part to receive an interrupt notification from a lower-order-side port, and output a port number of the port, the interrupt notification having been sent by the I/O device;

an interrupt factor address memory part to store interrupt factor address information including a plurality of sets each having a port number and an interrupt factor address being an address to be used for reading an interrupt factor;

an address selecting part to take as input the port number outputted by the interrupt notification receiving part; acquire the interrupt factor address from the interrupt factor address information of the interrupt factor address memory part based on the port number inputted; determine whether or not a device connected to a port of the port number inputted is the I/O device based on connection information held in advance; and when having determined that the device connected to the port is the I/O device, output the interrupt factor address acquired from the interrupt factor address memory part; and a lower-order-side transmitting part to transmit a factor read request for the interrupt factor, the factor read request including the interrupt factor address outputted by the address selecting part, to the I/O device connected to the port.

Advantageous Effects of Invention

The present invention can provide an interrupt means with which an address indicating the storing location of an interrupt factor need not be set in advance.

BRIEF DESCRIPTION OF DRAWINGS

FIG. 5 presents an address information memory table 1041 held by an interrupt factor address memory part 104 according to Embodiment 1.

FIG. 6 presents an intra-I/O-device data read address memory table 1081 held by an intra-I/O-device data read address memory part 108 according to Embodiment 1.

DESCRIPTION OF EMBODIMENTS

Embodiment 1

Figure 1:
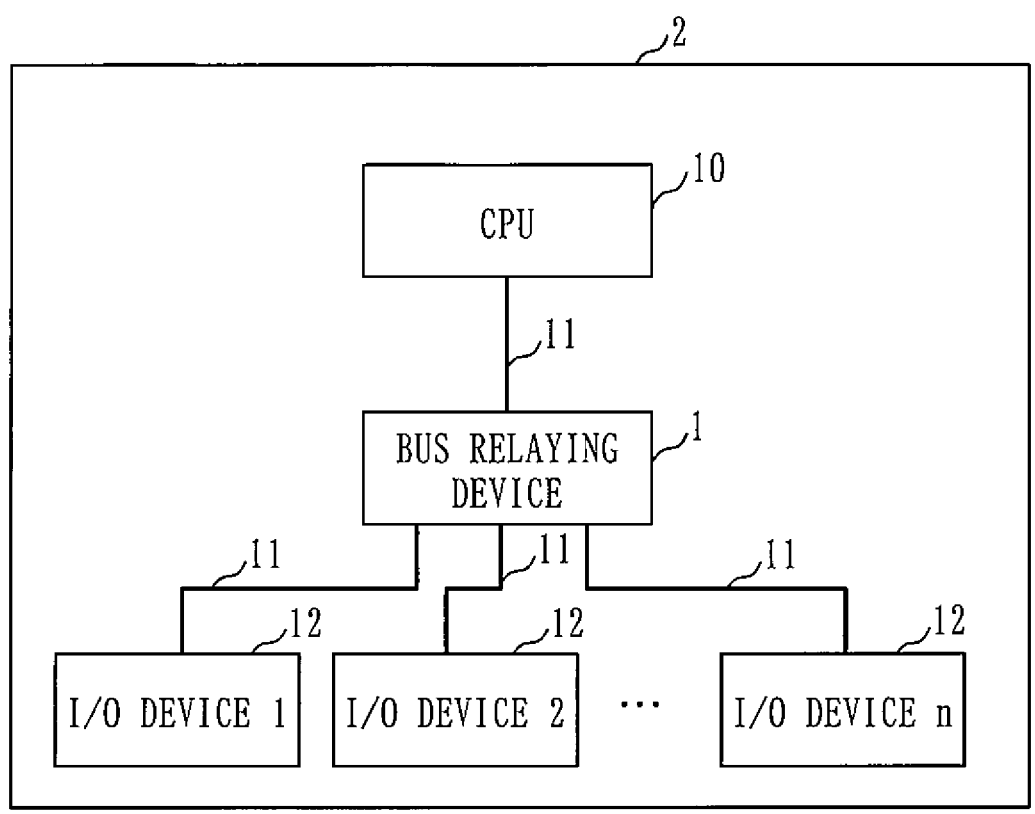
FIG. 1 is a diagram illustrating a system 2 having a single-stage connection of a bus relaying device 1 according to Embodiment 1.
Figure 2:
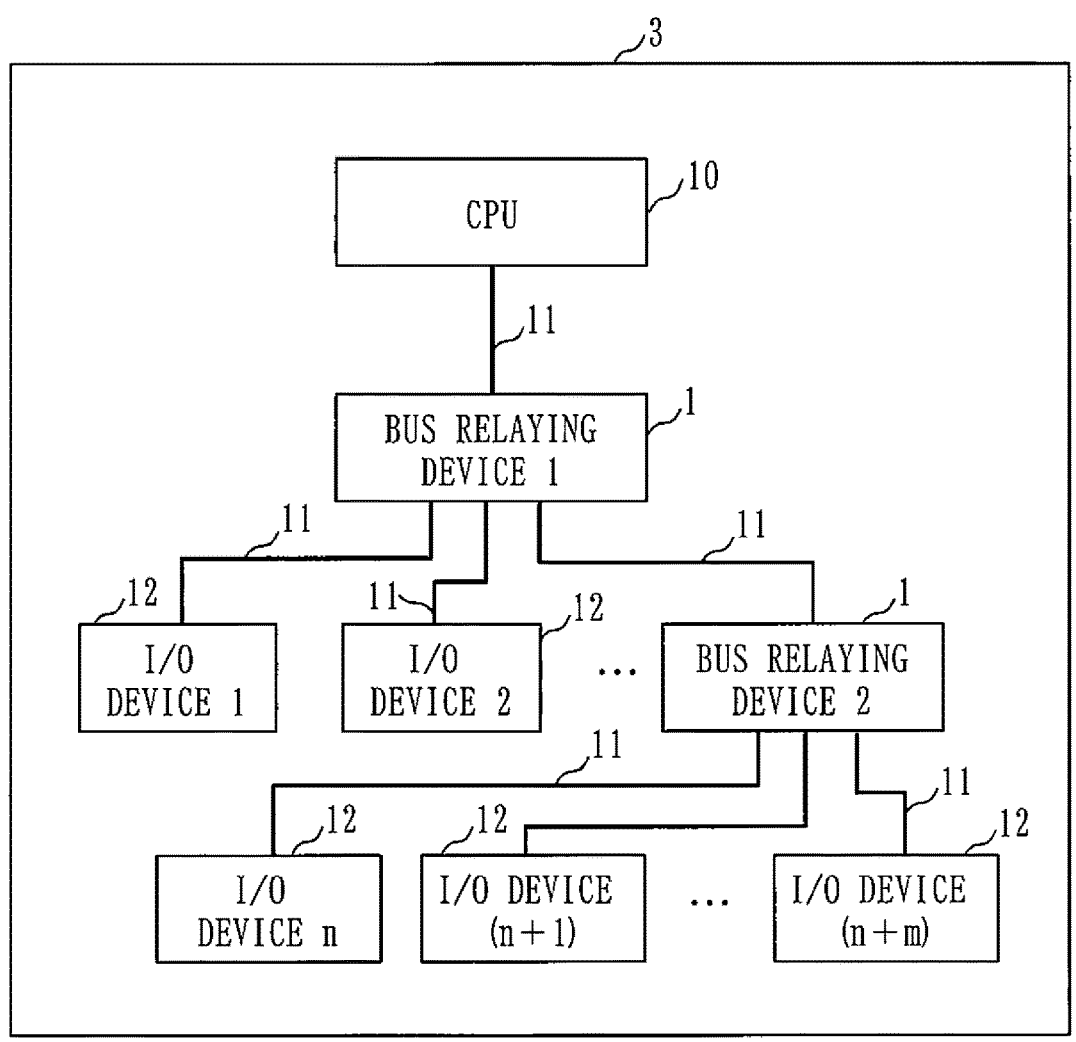
FIG. 2 is a diagram illustrating a system 3 having a multistage (two-stage) connection of bus relaying devices 1 according to Embodiment 1.

FIGS. 1 and 2 illustrate a configuration of a system 2 and a configuration of a system 3, respectively, each using a bus relaying device 1.

FIG. 1 illustrates the system 2 having a single-stage connection of a bus relaying device 1 according to Embodiment 1.

FIG. 2 is a diagram illustrating the system 3 having a multistage (two-stage) connection of bus relaying devices 1. As illustrated in FIGS. 1 and 2, each of the systems 2 and 3 includes the bus relaying device 1, a CPU (Central Processing Unit) 10, an I/O (Input/Output) device 12, and a bus 11. The system 2 of FIG. 1 includes one CPU 10, one bus relaying device 1, and the plurality of I/O devices 12. The system 3 of FIG. 2 includes one CPU 10, the two bus relaying devices 1, and the plurality of I/O devices 12.

The bus relaying device relays interrupt information communicated between the CPU device and the I/O device.

As illustrated in FIGS. 1 and 2, either the CPU or another relaying device is connected to the upper-order side of the bus relaying device. Of the I/O device and a relaying device other than the upper-order-side relaying device, at least the I/O device is connected to the lower-order side of the bus relaying device.

Figure 3:
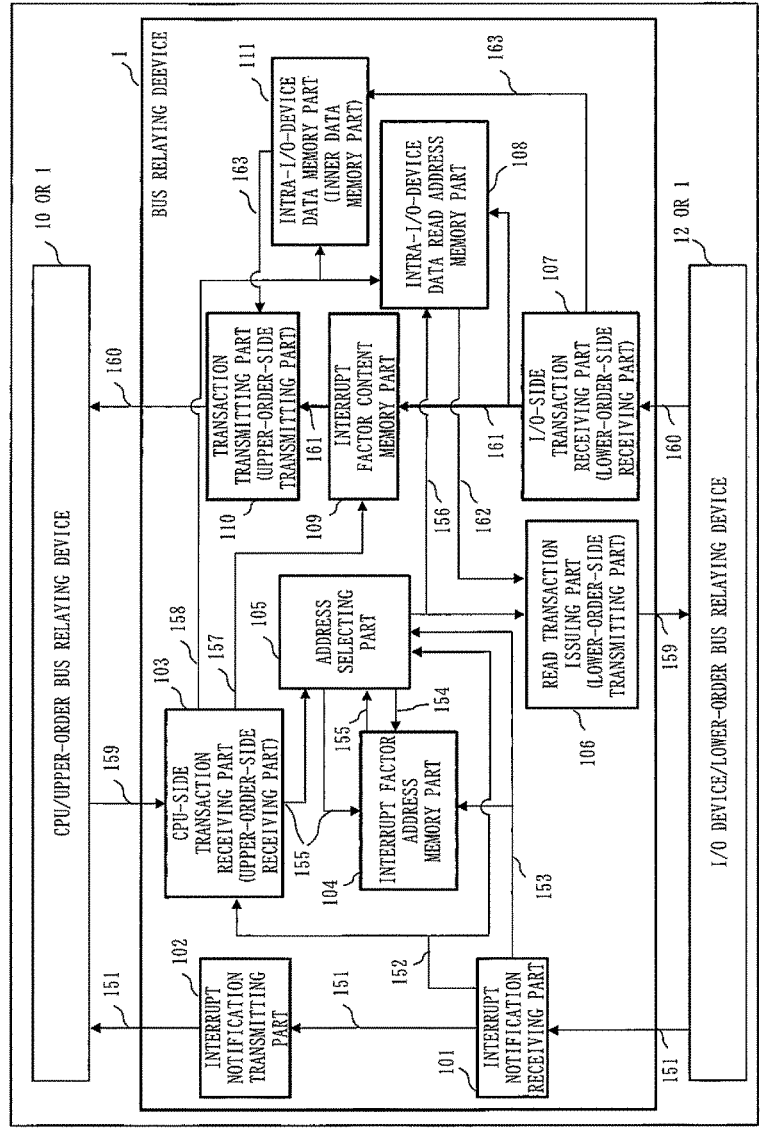
FIG. 3 is a block configuration diagram of the bus relaying device 1 according to Embodiment 1.

FIG. 3 is a configuration diagram of the bus relaying device 1. The bus relaying device 1 includes an interrupt notification receiving part 101, an interrupt notification transmitting part 102, a CPU-side transaction receiving part 103 (upper-order-side receiving part), an interrupt factor address memory part 104, an address selecting part 105, a read transaction issuing part 106 (lower-order-side transmitting part), an I/O-side transaction receiving part 107 (lower-order-side receiving part), an intra-I/O-device data read address memory part 108, an interrupt factor content memory part 109 (interrupt factor memory part), a transaction transmitting part 110 (upper-order-side transmitting part), and an intra-I/O-device data memory part 111 (inner data memory part).

In the bus relaying device 1, as illustrated in FIG. 3, an interrupt notification 151, an interrupt notification reception flag 152, a connection port number 153, an address look-up instruction 154, address information 155, a transmission address 156, an interrupt factor read instruction 157, an intra-I/O-device data read address 158 (data read address), a read request 159, read data 160, an interrupt factor content 161, an intra-I/O-device data read address 162, intra-I/O-device data 163 (internal data), and the like are exchanged.

Figure 4:
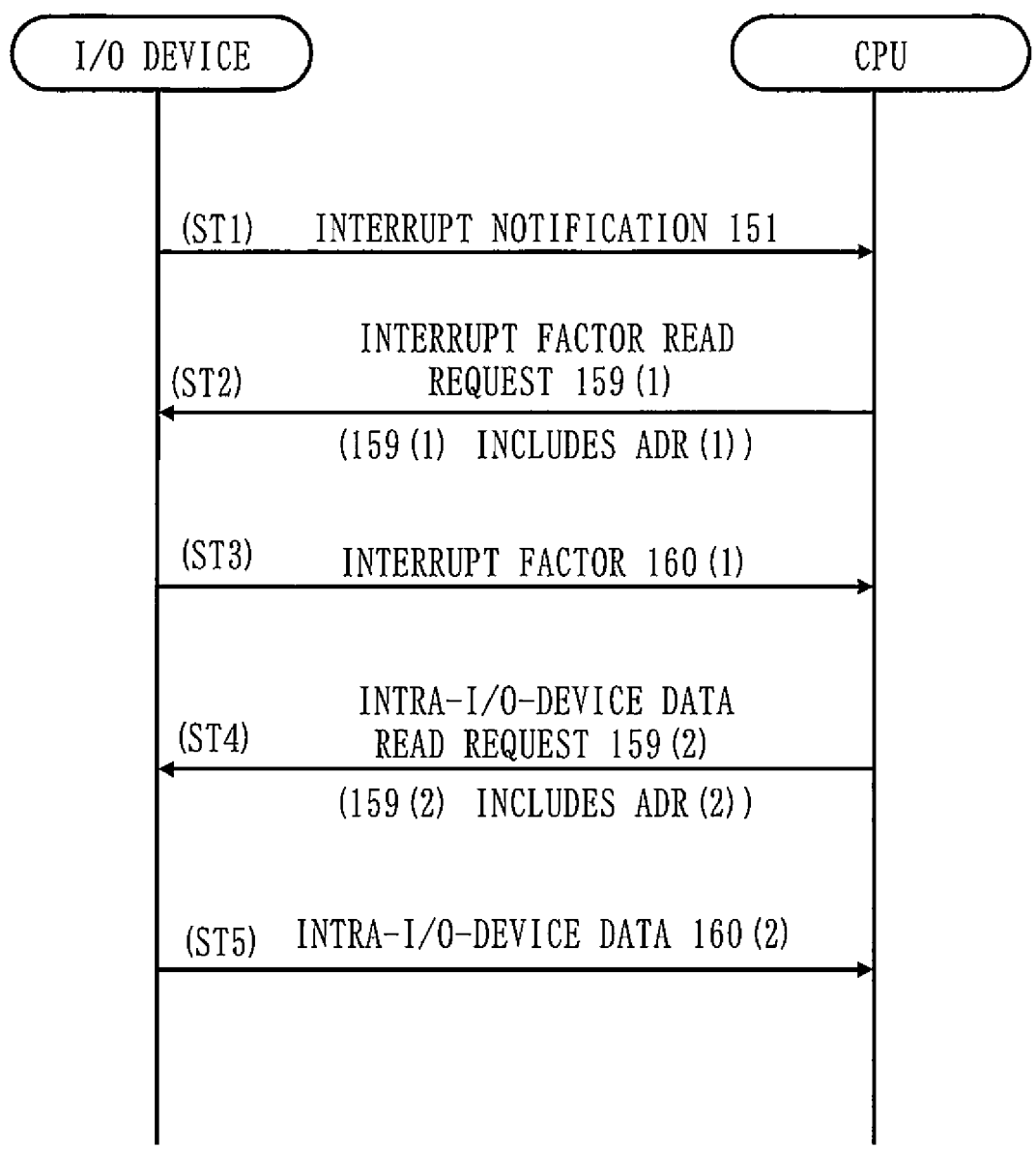
FIG. 4 is a diagram explaining information exchange, on which Embodiment 1 is premised, between an I/O device and a CPU.

FIG. 4 illustrates information exchange, on which Embodiment 1 is premised, of information on interrupt between the I/O device and the CPU.

(ST1) The I/O device transmits the interrupt notification 151.

(ST2) As a response to the interrupt notification 151, the CPU transmits an interrupt factor read request 159(1) (factor read request) to the I/O device. The read request 159(1) includes an address for reading the interrupt factor (to be sometimes referred to as ADR(1) hereinafter). Two types of read requests will appear in the following embodiment.

The two types of read requests are an interrupt factor read request and an intra-I/O-device data read request. The former may be referred to as read request 159(1) and the latter may be referred to as read request 159(2). Responses to the read requests 159(1) and 159(2) are an interrupt factor and intra-I/O-device data, respectively, which may be referred to as interrupt factor 160(1) and intra-I/O-device data 160(2), respectively. Both the interrupt factor 160(1) and the intra-I/O-device data 160(2) are the read data 160.

(ST3) As the response to the interrupt factor read request 159(1), the I/O device transmits the interrupt factor 160(1).

(ST4) Having received the interrupt factor 160(1), the CPU transmits the read request 159(2) (data read request) which requests reading data of the I/O device. The read request 159(2) includes an intra-I/O-device data read address (to be sometimes referred to as ADR(2) hereinafter) indicating the location of data in the I/O device.

(ST5) When having received the read request 159(2), the I/O device transmits the intra-I/O-device data 160(2).

Address information, a transmission address, an intra-I/O-device data read address, and the like will appear in the following embodiment. Each of these addresses is either an ADR(1) or ADR(2) mentioned above. The address included in the interrupt factor read request 159(1) is ADR(1), and the address included in the read request 159(2) which requests reading data in the I/O device is ADR(2). ADR(1) and ADR(2) may be respectively referred to as transmission address (ADR(1)) and intra-I/O-device data read address (ADR(2)) in the following embodiment.

FIG. 5 presents an address information memory table 1041 (interrupt factor address information) held by the interrupt factor address memory part 104. As illustrated in FIG. 5, the address information memory table 1041 has an entry number storing area 1041-1 which identifies an entry (a record formed of rows), a status storing area 1041-2 indicating whether the entry is valid or invalid, a connection port number storing area 1041-3 where a connection port number is stored, a transmission address storing area 1041-4 where a transmission address is stored, access history storing area 1041-5 where an access history is stored, and an access count storing area 1041-6 where an access count is stored. The access history and access count represent a using situation where a connection port of a port number is used.

FIG. 6 presents an intra-I/O-device data read address memory table 1081 held by the intra-I/O-device data read address memory part 108. As illustrated in FIG. 6, the intra-I/O-device data read address memory table 1081 has an entry number storing area 1081-1 which identifies an entry, a status storing area 1081-2 indicating whether the entry is valid or invalid, a transmission address storing area 1081-3 where a transmission address is stored, an interrupt factor content storing area 1081-4 where an interrupt factor content is stored, and an intra-I/O-device data read address storing area 1081-5 where an intra-I/O-device data read address is stored.

(Explanation on Operation)

The system operation of this embodiment includes the following operations:

(A) Operation of when an interrupt notification is received;

(B) Operation of when an interrupt factor is received;

(C) Operation of when an interrupt factor read request is received (transmitted by a CPU/upper-order bridge);

(D) Operation of when an intra-I/O-device data read request is received (transmitted by a CPU/upper-order bridge); and (E) Operation of when intra-I/O-device data is received.

The operation of the system according to the embodiment starts when the interrupt notification reception flag 152 indicated by "(A) operation of when an interrupt notification is received (a2)" hereinafter becomes valid, and ends when the intra-I/O-device data of "(E) Operation of when intra-I/O-device data is received (e5)" is transmitted.

As will be described hereinafter, the address selecting part 105 (a10 described later), the interrupt factor content memory part 109 (b3-2 described later), the data memory part 111 (d6, e4 described later), and the like can decide the presence of an upper- or lower-order connection device. This is because the address selecting part 105 and the like have connection information in advance on a device connected to the upper-order or lower-order side.

Figure 7:
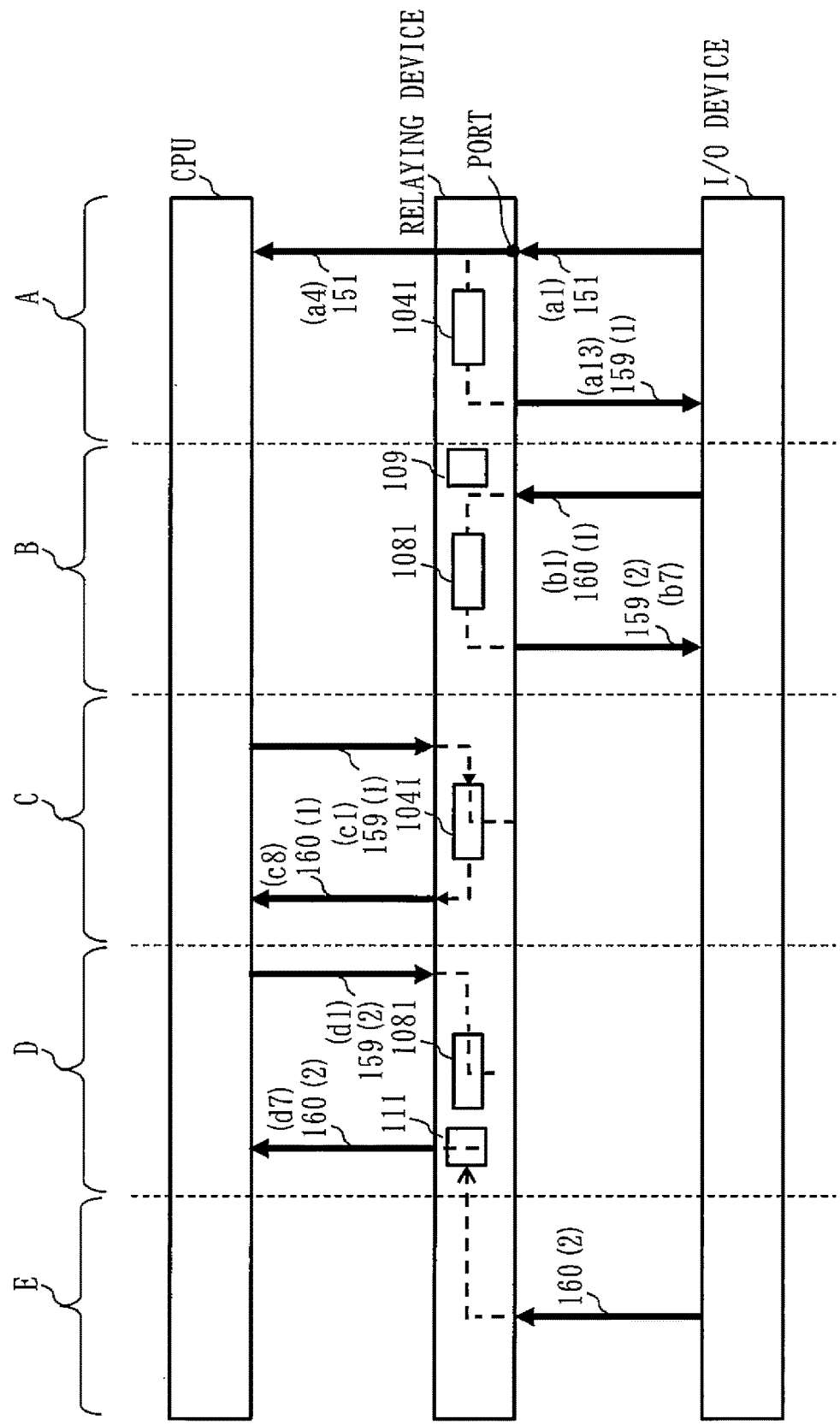
FIG. 7 is a diagram illustrating an operation outline of the system 2 according to Embodiment 1.

FIG. 7 is a diagram illustrating an operation outline of the single-stage connection of FIG. 1. A to E in FIG. 7 correspond to (A) to (E) described above. In Embodiment 1, when the relaying device receives the interrupt notification 151, the interrupt factor read request 159(1) is transmitted based on the address information memory table 1041 without waiting for a response from the CPU. This will be described later in detail. The relaying device, when having received the interrupt factor 160(1), transmits the intra-I/O-device data read request 159(2) based on the intra-I/O-device data read address memory table 1081 without waiting for a response of the CPU.

This will be described in detail hereinafter.

<Operation Details>

The operations described above will be described hereinafter.

<(A) Operation of when Interrupt Notification is Received>

Regarding "(A) Operation of When Interrupt Notification is Received", the following constituent elements in the bus relaying device 1 concern the operation. More specifically, the interrupt notification receiving part 101, the interrupt notification transmitting part 102, the CPU-side transaction receiving part 103 (to be referred to as CPU-side receiving part hereinafter), the interrupt factor address memory part 104 (to be referred to as address memory part 104 hereinafter), the address selecting part 105, the read transaction issuing part 106 (to be referred to as I/O-side transmitting part hereinafter), and the intra-I/O-device data read address memory part 108 (to be referred to as address memory part 108 hereinafter) concern the operation.

Figure 8:
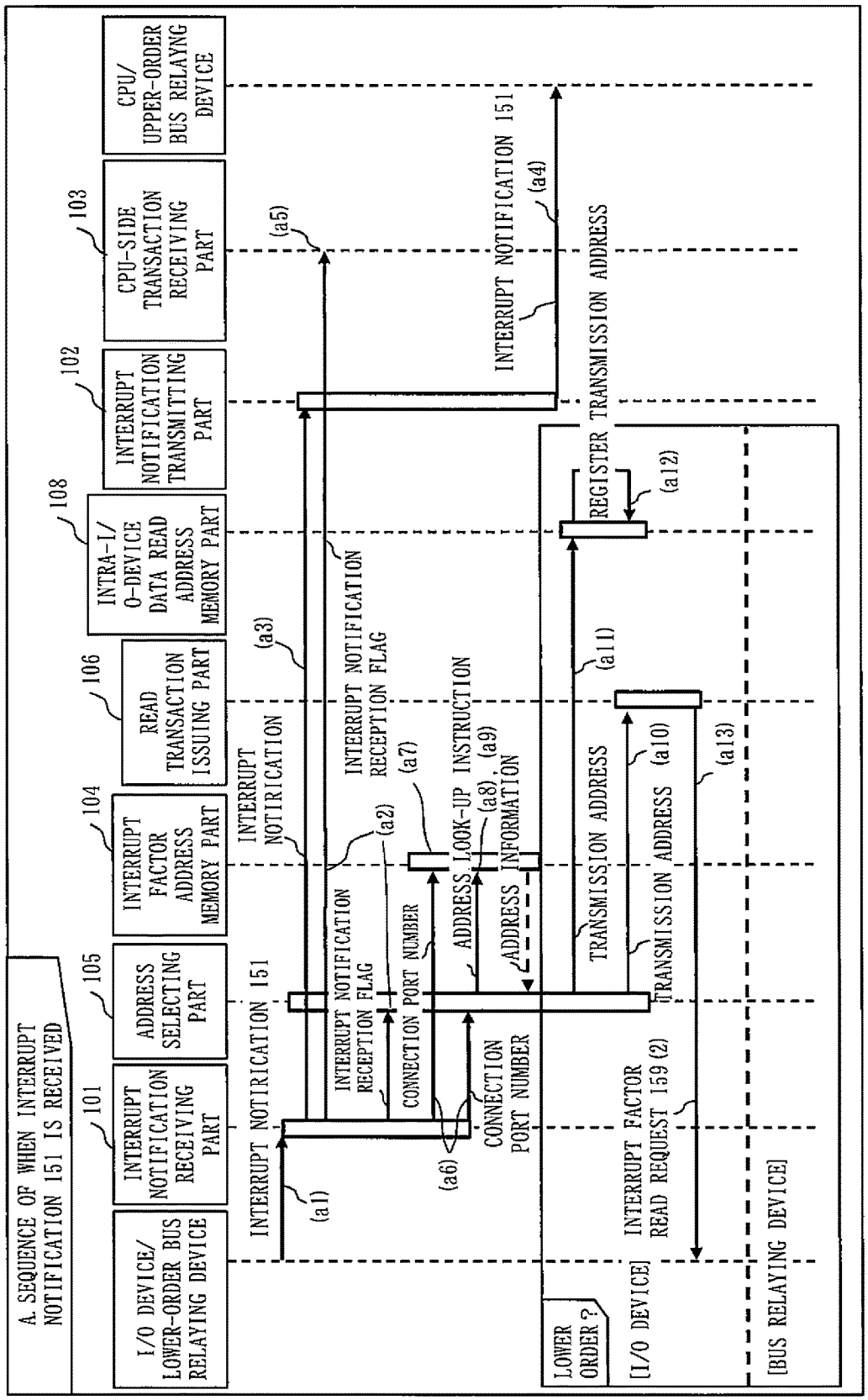
FIG. 8 is a UML sequence chart indicating a relation among data, control flow, and constituent elements in "(A) Operation of When Interrupt Notification is Received" according to Embodiment 1.

FIG. 8 is a UML sequence chart indicating a relation among data, control flow, and the constituent elements described above in "(A) Operation of when Interrupt Notification is Received". In FIG. 8, the direction of time is downward from the above, and horizontal arrows represent the flows of data and control. A rectangular portion on a broken line connected to a constituent element indicates that a process is performed in the constituent element to which the broken line is connected.

When an interrupt notification is received, the following process is performed.

(a1) The interrupt notification receiving part 101 in the bus relaying device 1 receives the interrupt notification 151 issued by the I/O device 12 or a "lower-order bus relaying device" (in the case of (a4) described below).

(a2) The interrupt notification receiving part 101 sends the interrupt notification reception flag 152 indicating that the interrupt notification 151 is received, to the CPU-side receiving part 103 and the address selecting part 105.

(a3) When having received the interrupt notification 151 issued by the I/O device 12 or the lower-order bus relaying device, the interrupt notification receiving part 101 sends the interrupt notification 151 to the interrupt notification transmitting part 102 simultaneously with above (a2) of flag sending.

(a4) When having received the interrupt notification 151 from the interrupt notification receiving part 101, the interrupt notification transmitting part 102 transmits the interrupt notification 151 to the CPU 10 or an upper-order bus relaying device 1.

(a5) After having received the interrupt notification reception flag 152 in above (a2) of flag sending, when the CPU-side receiving part 103 has received the interrupt factor read request 159(1) ((c3) and (c6) to be described later) sent from the CPU 10 or the upper-order bus relaying device 1, the CPU-side receiving part 103 outputs "the address information 155 and the interrupt factor read instruction 157" to the concerned constituent elements in the bus relaying device.

(a6) The interrupt notification receiving part 101 sends the connection port number 153 of the bus relaying device that has received the interrupt notification 151, to the address memory part 104 and the address selecting part 105 simultaneously with above (a2) of flag sending. The connection port number 153 is sent in order to identify the I/O device 12 that has notified the interrupt notification 151 or the lower-order bus relaying device that has transferred the interrupt notification 151.

(a7) The address memory part 104 has the address information memory table 1041 illustrated in FIG. 5. The address information memory table 1041 will be referred to as table 1041 hereinafter. When having received the connection port number 153 from the interrupt notification receiving part 101, the address memory part 104 stores the received connection port number 153 to the connection port number storing area 1041-3 of an un-used (invalid) entry (a unit (column) that manages No., status, connection port number, transmission address, access history, and access count, as a series of information) of the table 1041 (S113 and S114 of FIG. 13 to be described later).

(a8) The address selecting part 105, when having received the interrupt notification reception flag 152 in (a2) of flag sending, acquires the address information 155 (ADR(1)) stored in the address memory part 104, based on the connection port number 153 accepted from the interrupt notification receiving part 101 in (a6) of connection port number sending. The address selecting part 105 acquires the address information 155 by outputting the address look-up instruction 154 to the address memory part 104.

(a9) When acquiring the address information 155 in (a8), the address selecting part 105 acquires the "transmission address" of an entry as a target, the target being an entry in the table 1041 where the number stored in the connection port number storing area 1041-3 of the valid (in-use) entry agrees with the connection port number 153 accepted from the interrupt notification receiving part 101. More specifically, the address selecting part 105 acquires the "transmission address" of an entry that has the connection port number 153 accepted from the interrupt notification receiving part 101 and that is "valid" (an entry where the transmission address of the same port number is stored), as the address information 155. In this case, the address selecting part 105 may select, according to the access history, the transmission address of an entry that has been accessed most recently (an entry whose number representing the access history is small). Also, the address selecting part 105 may select the transmission address of an entry that has been accessed most frequently.

For example, referring to FIG. 5, if the connection port number 153 received from the interrupt notification receiving part 101 is "0", when selecting the transmission address based on the access history, the address selecting part 105 selects the transmission address "1020" of No. 3 as the address information. When selecting the transmission address based on the access count, the address selecting part 105 selects the transmission address "1000" of No. 1 as the address information.

(a10) The address selecting part 105 decides the device connected to the lower order of a port of the connection port number 153, from the connection port number 153 received from the interrupt notification receiving part 101 in (a6) of connection port number sending. If the address selecting part 105 decides that the I/O device 12 is connected to the lower order of the corresponding port, the address selecting part 105 outputs the address information 155 acquired in above (a8), to the I/O-side transmitting part 106 as the transmission address 156. If a lower-order bus relaying device is connected to the lower order of the port corresponding to the accepted connection port number 153, the address selecting part 105 does not output the address information 155 acquired in above (a8) to the I/O-side transmitting part 106. Therefore, among bus relaying devices, only a bus relaying device connected to an I/O device issues an interrupt factor read request without waiting for an interrupt factor read request from the CPU.

(a11) When outputting the transmission address 156 to the I/O-side transmitting part 106 (a case where an I/O device is connected to the lower order), the address selecting part 105 outputs the transmission address 156 to the address memory part 108 simultaneously.

(a12) The address memory part 108 has the intra-I/O-device data read address memory table 1081. The intra-I/O-device data read address memory table 1081 will be referred to as table 1081 hereinafter. After reading the interrupt factor, the CPU 10 reads intra-I/O-device data from the I/O device. The table 1081 is a table that associates the "transmission address 156" with the "read address" for reading the intra-I/O-device data by the CPU 10. When having accepted the transmission address 156 from the address selecting part 105 in (a11), the address memory part 108 stores (S193 and S194 of FIG. 21 to be described later) the accepted transmission address 156 to the transmission address storing area 1081-3 of an un-used (invalid) entry (a unit that manages No., status, transmission address, interrupt factor content, and intra-I/O-device data read address (to be referred to as data read address hereinafter), as a series of information) of the table 1081. Note that only the transmission address will be stored, and the status will be under-registration status.

(a13) The I/O-side transmitting part 106 issues the interrupt factor read request 159 (1) to the I/O device 12 based on the transmission address 156 acquired by (a10).

<(B) Operation of when Interrupt Factor is Received>

Regarding the operation of when the interrupt factor is received, the following constituent elements in the bus relaying device 1 concern the operation. More specifically, the I/O-side transmitting part 106, the I/O-side transaction receiving part 107 (to be referred to as I/O-side receiving part hereinafter), the address memory part 108, the interrupt factor content memory part 109, and the transaction transmitting part 110 concern the operation.

Figure 9:
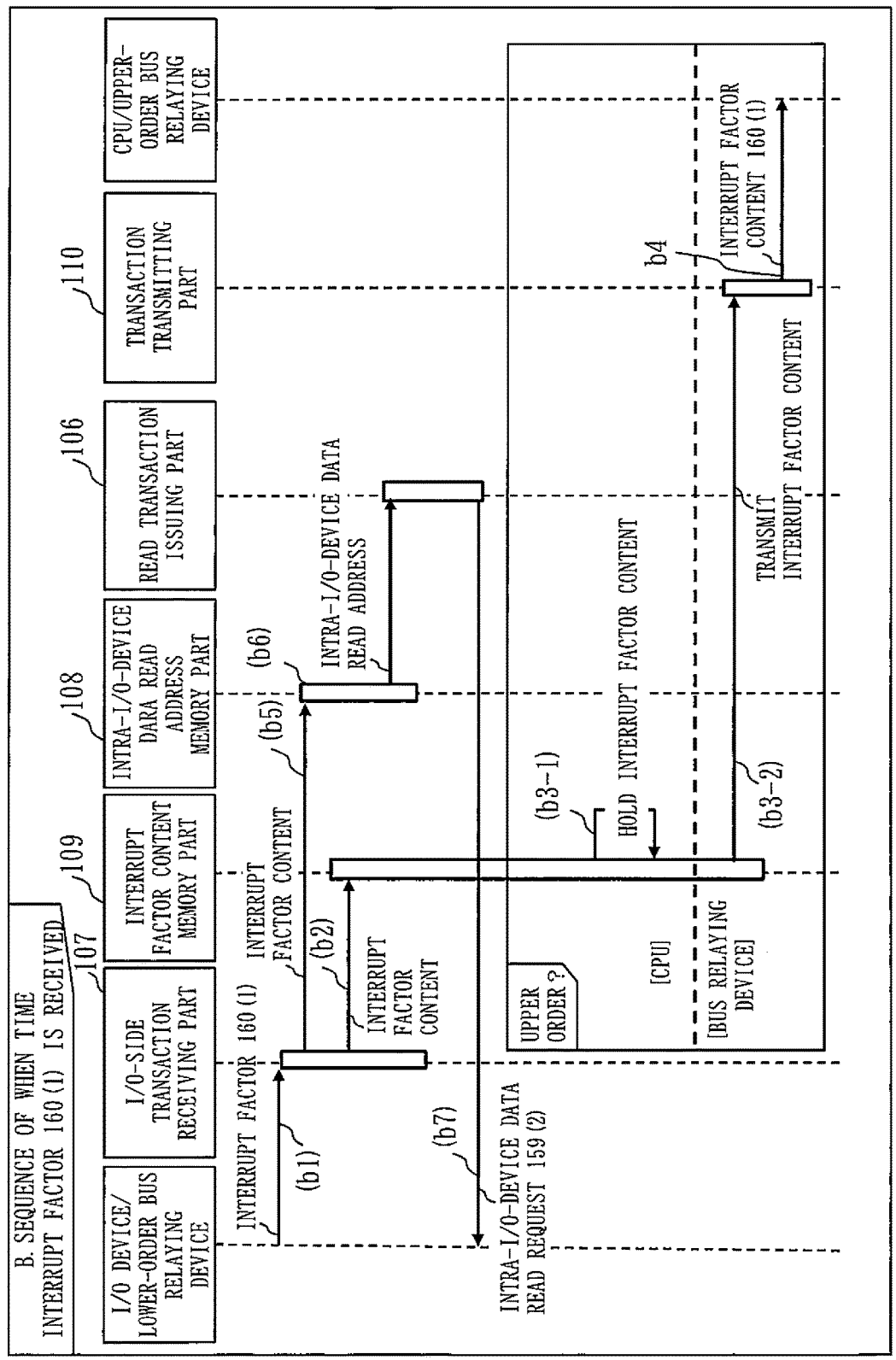
FIG. 9 is a UML sequence chart indicating a relation among data, control flow, and constituent elements in "(B) Operation of When Interrupt Factor is Received" according to Embodiment 1.

FIG. 9 is a UML sequence chart indicating a relation among data, control flow, and the above constituent elements of when the interrupt factor is received.

The following process is performed at the time of "(B) When Interrupt Factor is Received".

(b1) The bus relaying device 1 reads the interrupt factor from the I/O device 12 by the interrupt factor read request 159(1) issued to the I/O device 12 in (a13) of "(A) Operation of When Interrupt Notification is Received" described above. When having read the interrupt factor 160(1), the bus relaying device 1 receives the interrupt factor 160(1) (read data 160) with the I/O-side receiving part 107.

(b2) The I/O-side receiving part 107 extracts the interrupt factor content 161 from the interrupt factor (read data 160) and sends the same to the interrupt factor content memory part 109.

(b3-1) When having received the interrupt factor content 161, the interrupt factor content memory part 109 stores the interrupt factor content 161 to the memory area of the interrupt factor content memory part 109 if the upper-order-side connection destination is the CPU 10.

(b3-2) If the upper-order-side connection destination of the bus relaying device of the interrupt factor content memory part 109 is an upper-order bus relaying device, the interrupt factor content memory part 109 sends the interrupt factor content 161 to the transaction transmitting part 110.

(b4) When having received the interrupt factor content 161 from the interrupt factor content memory part 109, the transaction transmitting part 110 transmits the interrupt factor content 161 to the upper-order bus relaying device (read data 160).

(b5) Simultaneously with above (b2), the I/O-side receiving part 107 sends the interrupt factor content 161 to the address memory part 108.

(b6) From among valid-status entries stored in the table 1081, the address memory part 108 searches for entries where the transmission address 156 outputted by the address selecting part 105 in (a11) agrees with the value of the transmission address storing area 1081-3 and the interrupt factor content 61 received in (b5) agrees with the value of the interrupt factor content storing area 1081-4, when a lower-order-side connection is an I/O device. The address memory part 108 sends the value of the intra-I/O-device data read address storing area 1081-5 of an entry that agrees as the result of the search, to the I/O-side transmitting part 106 as the intra-I/O-device data read address 162. If agreement is not obtained in the above entry search, the address memory part 108 waits for the data read address 158 ((d3)

to be described later) transmitted from the CPU-side receiving part 103. When having received the data read address 158 from the CPU-side receiving part 103, the address memory part 108 sends the data read address 158 to the I/O-side transmitting part 106.

(b7) Based on the data read address 162 of (b6), the I/O-side transmitting part 106 issues the read request 159(2) for reading the intra-I/O-device data, to the I/O device 12.

<(C) Operation of when Interrupt Factor Read Request is Received>

In "(C) Operation of When Interrupt Factor Read Request is Received" where the read request for the interrupt factor is transmitted by the CPU 10 or the upper-order bus relaying device, the following constituent elements in the bus relaying device 1 concern the operation. More specifically, the CPU-side receiving part 103, the address memory part 104, the address selecting part 105, the I/O-side transmitting part 106, the interrupt factor content memory part 109, and the transaction transmitting part 110 concern the operation.

Figure 10:
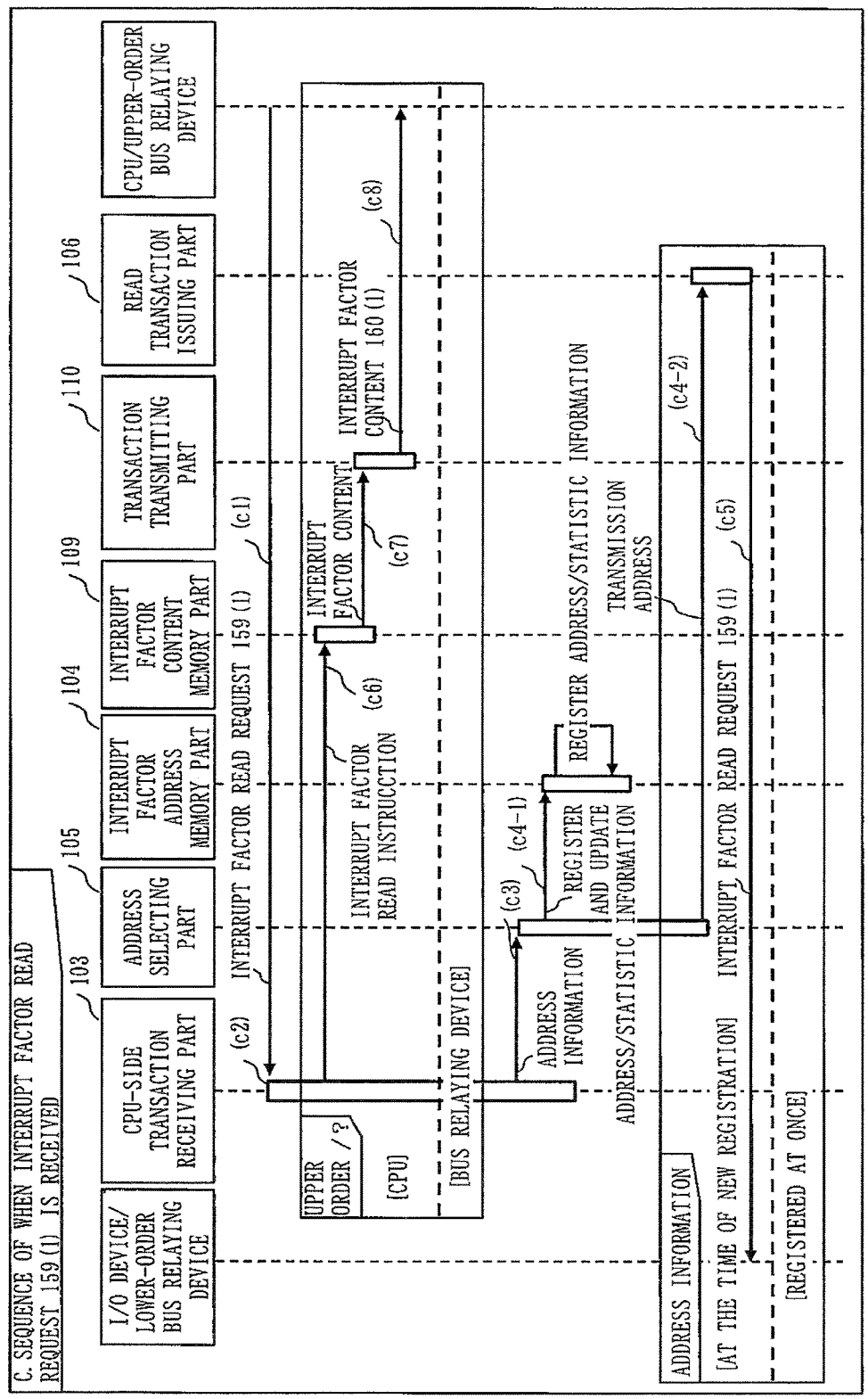
FIG. 10 is a UML sequence chart indicating a relation among data, control flow, and constituent elements in "(C) Operation of When Interrupt Factor Read Request is Received" according to Embodiment 1.

FIG. 10 is a UML sequence chart indicating a relation among data, control flow, and the constituent elements in "(C) Operation of When Interrupt Factor Read Request is Received".

The following process is performed at the time of "(C) When Interrupt Factor Read is Requested".

(c1) By above (a4), the interrupt notification 151 is sent to the CPU 10 or the upper-order bus relaying device. Hence, the interrupt notification 151 reaches the CPU 10. The CPU 10 issues the interrupt factor read request 159(1).

(c2) The CPU-side receiving part 103 receives the interrupt factor read request 159 sent from the CPU 10 or the upper-order bus relaying device.

(c3) The CPU-side receiving part 103 extracts the address information 155 from the interrupt factor read request 159 and sends the address information 155 to the address selecting part 105.

(c4-1) The address selecting part 105, when having accepted the address information 155 from the CPU-side receiving part 103, sends the received address information 155 to the address memory part 104. The address memory part 104 stores the transmission address indicated by the address information 155 to the transmission address storing area 1041-4 of the table 1041 in the form of, for example, "F. 3 Registration of Transmission Address, Access History, and Access Count" described later.

(c4-2) When registration of the transmission address occurs, the address selecting part 105 sends the transmission address 156 (ADR(1)) accepted from the address selecting part 105 to the I/O-side transmitting part 106 in order to transmit the interrupt factor read request 159(1) to the I/O device 12 or the lower-order bus relaying device.

(c5) The I/O-side transmitting part 106, when having accepted the transmission address 156 by above (c4-2), transmits the interrupt factor read request 159 to the I/O device 12 or the lower-order bus relaying device.

(c6) Simultaneously with above (c3), if the upper-order connection destination of the CPU-side receiving part 103 is the CPU 10, the CPU-side receiving part 103 outputs the interrupt factor read instruction 157 to the interrupt factor content memory part 109.

If the upper-order connection destination of the CPU-side receiving part 103 is an upper-order bus relaying device, the CPU-side receiving part 103 does not output the interrupt factor read instruction 157.

(c7) When having accepted the interrupt factor read instruction 157, the interrupt factor content memory part 109 sends the content of the interrupt factor stored in the interrupt factor content memory part 109 to the transaction transmitting part 110. At the time the interrupt factor content memory part 109 accepts the interrupt factor read instruction 157 (the upper-order connection destination is the CPU), if the interrupt factor content memory part 109 has not accepted the interrupt factor content 161 from the I/O-side receiving part 107 yet, it waits for accepting the interrupt factor content 161 from the I/O-side receiving part 107 (b2). When having accepted the interrupt factor content 161, the interrupt factor content memory part 109 sends the interrupt factor content 161 to the transaction transmitting part 110.

(c8) When having accepted the interrupt factor content 161, the transaction transmitting part 110 transmits the interrupt factor content 161 to the CPU 10 as the read data 160.

<(D) Operation of when Intra-I/O-Device Data Read Request is Received>

In "(D) Operation of When Intra-I/O-Device Data Read Request 159 is Received" where the read request 159 is transmitted from the CPU 10 or the upper-order bus relaying device, the following constituent elements in the bus relaying device 1 concern the operation.

Figure 11:
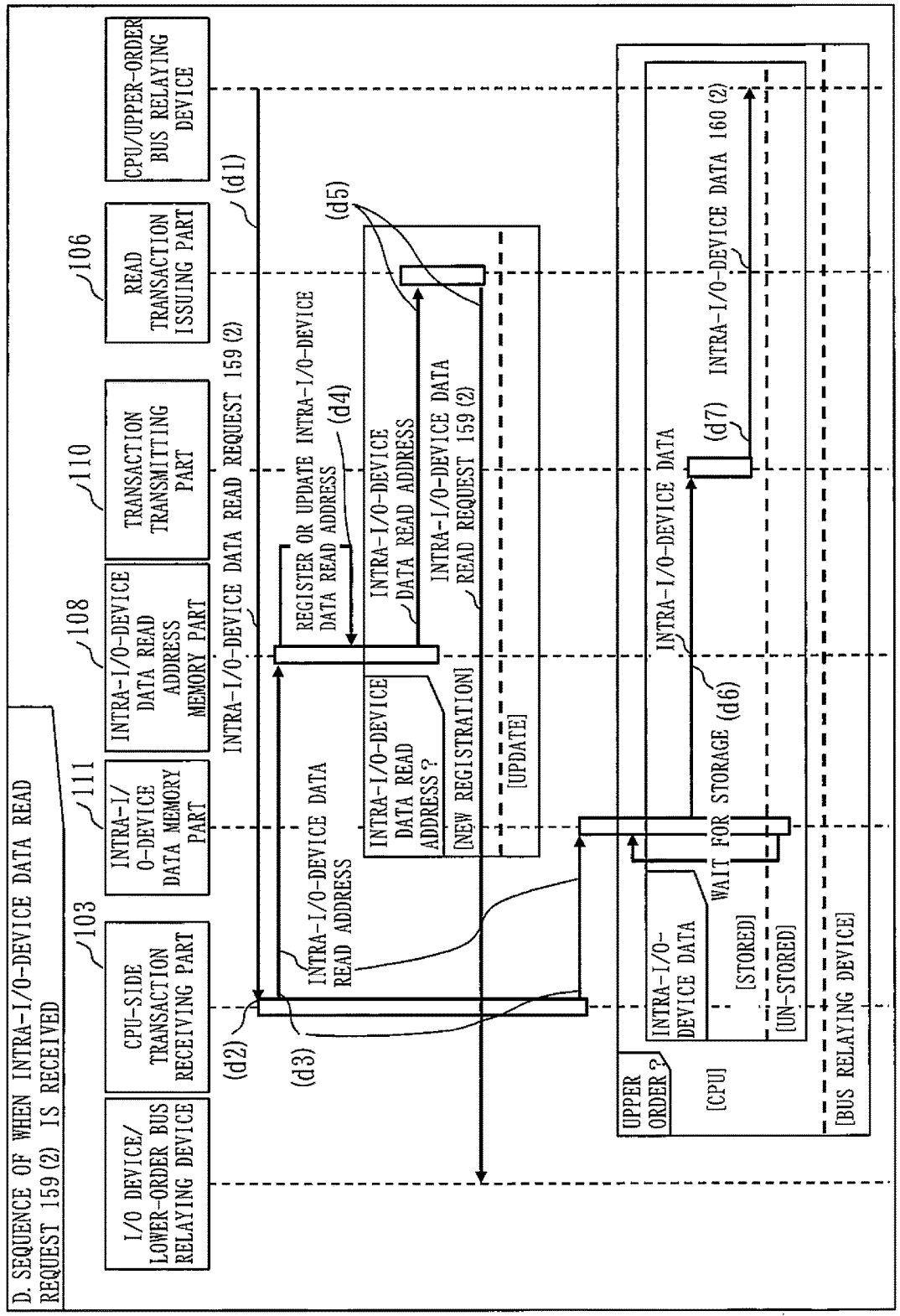
FIG. 11 is a UML sequence chart indicating a relation among data, control flow, and constituent elements in "(D) Operation of When Intra-I/O-Device Data Read Request is Received" according to Embodiment 1.

FIG. 11 is a UML sequence chart indicating a relation among data, control flow, and the constituent elements of when the intra-I/O-device data read request is received.

The following process is performed when the intra-I/O-device data read is requested.

(d1) When having received the read data 160(1) (interrupt factor content 161) from the transaction transmitting part 110 in above (c8), the CPU 10 outputs the intra-I/O-device data read request 159(2) to the bus relaying device 1.

(d2) The CPU-side receiving part 103 receives the intra-I/O-device data read request 159(2) from the CPU 10 "or the upper-order bus relaying device".

(d3) When having received the intra-I/O-device data read request 159(2), the CPU-side receiving part 103 extracts the data read address 158 (ADR(2)) from the read request 159(2). The CPU-side receiving part 103 sends the extracted data read address 158 to the address memory part 108 and the intra-I/O-device data memory part 111.

(d4) When having accepted the data read address 158, the address memory part 108 registers it to the data read address storing area 1081-5 of the table 1081 or updates the entry that has already been registered (refer to "G.3 Storage and Update of Data Read Address" to be described later).

(d5) If there is no corresponding address in the table 1081 as in "G. 2 Registration of Interrupt Factor Content and Output of Data Read Address (3)" to be described later, the address memory part 108 registers the data read address 158 (ADR(2)) received from the CPU-side receiving part 103 to the table 1081. Simultaneously, the address memory part 108 sends the data read address 162 (ADR(2)) received from the CPU-side receiving part 103 to the I/O-side transmitting part 106. The I/O-side transmitting part 106 outputs the intra-I/O-device data read request 159(2) to the I/O device 12 or the lower-order bus relaying device.

(d6) Where the upper-order connection of the data memory part 111 is the CPU 10, the data memory part 111 that has accepted the data read address 158 (ADR(2)) by above (d3) sends the intra-I/O-device data 163 stored in it to the transaction transmitting part 110 if the intra-I/O-device data has already been stored in the data memory part 111.

(d7) The transaction transmitting part 110 that has accepted the intra-I/O-device data 163 transmits the intra-I/O-device data 163 to the CPU 10 or the upper-order bus relaying device, as the read data 160(2).

<(E) Operation of when Intra-I/O-Device Data is Received>

In the operation that takes place when the intra-I/O-device data (read data 160(2)) is received from the I/O device 12 or the lower-order bus relaying device, the following constituent elements in the bus relaying device 1 concern the operation. More specifically, the I/O-side receiving part 107, the transaction transmitting part 110, and the data memory part 111 concern the operation.

Figure 12:
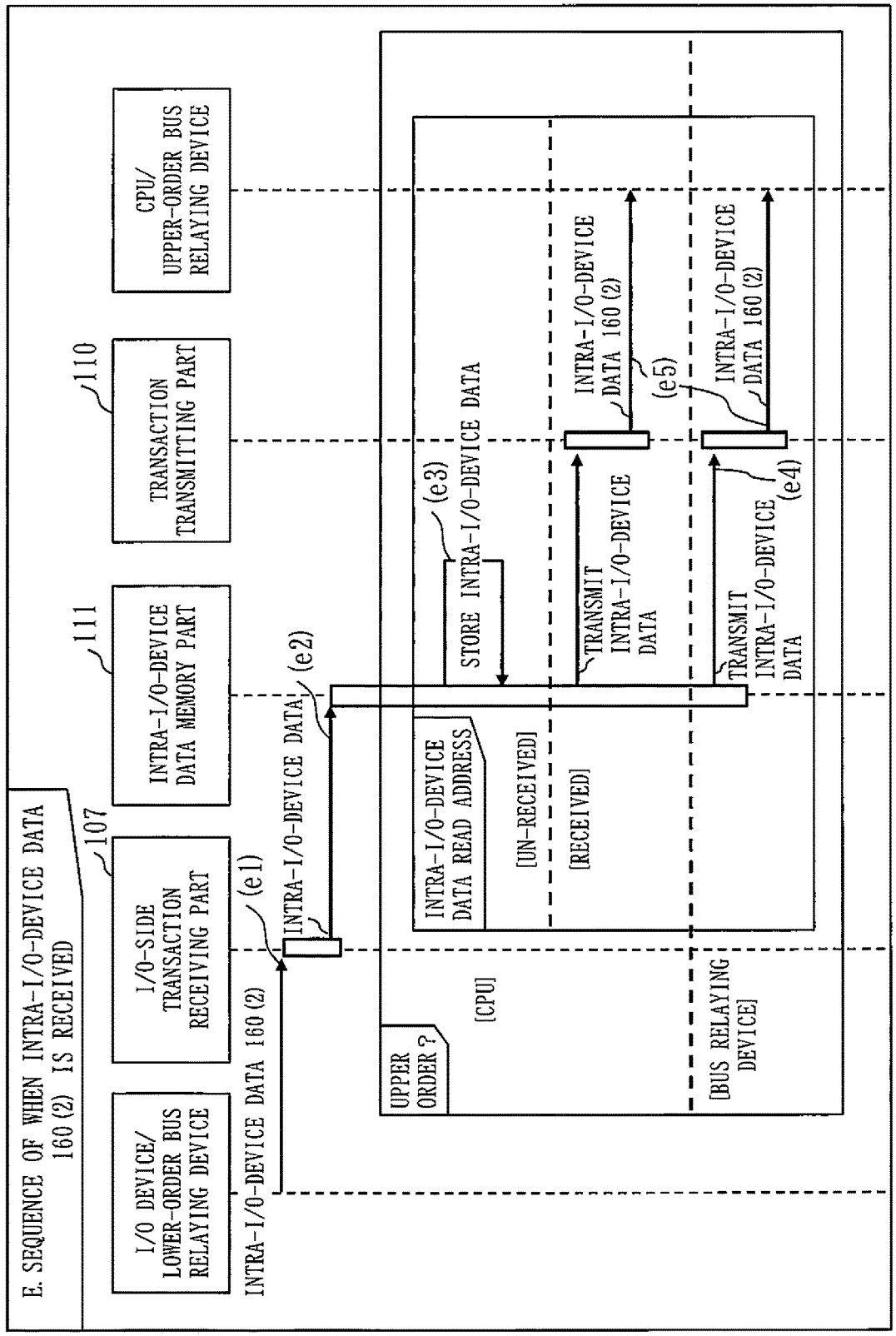
FIG. 12 is a UML sequence chart indicating a relation among data, control flow, and constituent elements in "(E) Operation of When Intra-I/O-Device Data is Received" according to Embodiment 1.

FIG. 12 is a UML sequence chart indicating a relation among data, control flow, and the constituent elements of when the intra-I/O-device data is received.

The following process is performed when the intra-I/O-device data is received.

(e1) The I/O-side receiving part 107 receives the intra-I/O-device data 163 (read data 160(2)) which has been sent by the I/O device 12 or the lower-order bus relaying device in response to the intra-I/O-device data read request 159(2) transmitted by (b7) of "B. Operation of When Interrupt Factor is Received" or (d5) of "D. Operation of When Intra-I/O-Device Data Read Request is Received".

(e2) When having received the intra-I/O-device data 163 (read data 160(2)), the I/O-side receiving part 107 sends the intra-I/O-device data 163 to the data memory part 111.

(e3) Where the upper-order connection of the data memory part 111 is the CPU 10, the data memory part 111, when having accepted the intra-I/O-device data 163, stores the intra-I/O-device data 163. Note that if the intra-I/O-device data read address 158 (ADR(2)) has already been accepted by the CPU-side receiving part 103, the data memory part 111 sends the intra-I/O-device data 163 to the transaction transmitting part 110 instead of storing it.

(e4) Where the upper-order connection of the bus relaying device of the data memory part 111 is the upper-order bus relaying device 1, the data memory part 111, when having accepted the intra-I/O-device data 163, sends the intra-I/O-device data 163 to the transaction transmitting part 110 instead of storing it.

(e5) When having accepted the intra-I/O-device data 163, the transaction transmitting part 110 transmits the intra-I/O-device data to the CPU 10 or the upper-order bus relaying device 1, as the read data 160.

<F. Operation of Address Memory Part 104>

The operation of the address memory part 104 will be summarized as follows.

FIGS. 13 to 20 are flowcharts illustrating the operation of the address memory part 104.

Figure 13:
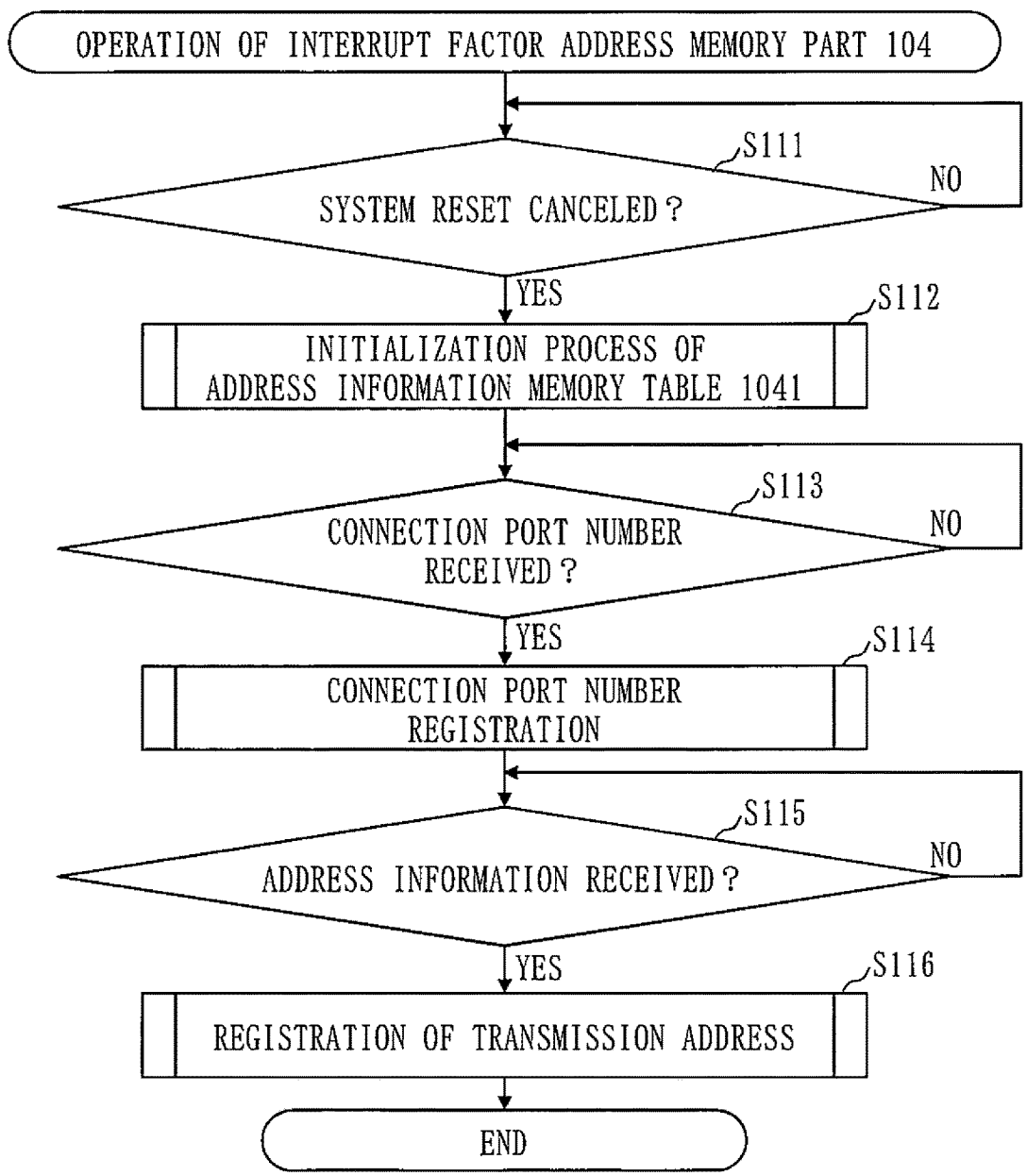
FIG. 13 is a flowchart illustrating an operation of the interrupt factor address memory part 104 according to Embodiment 1.

FIG. 13 illustrates the entire operation of the address memory part 104, and FIGS. 14 to 20 illustrate a subroutine process of FIG. 13. The subject of the operation of FIG. 13 is the address memory part 104.

Figure 14:
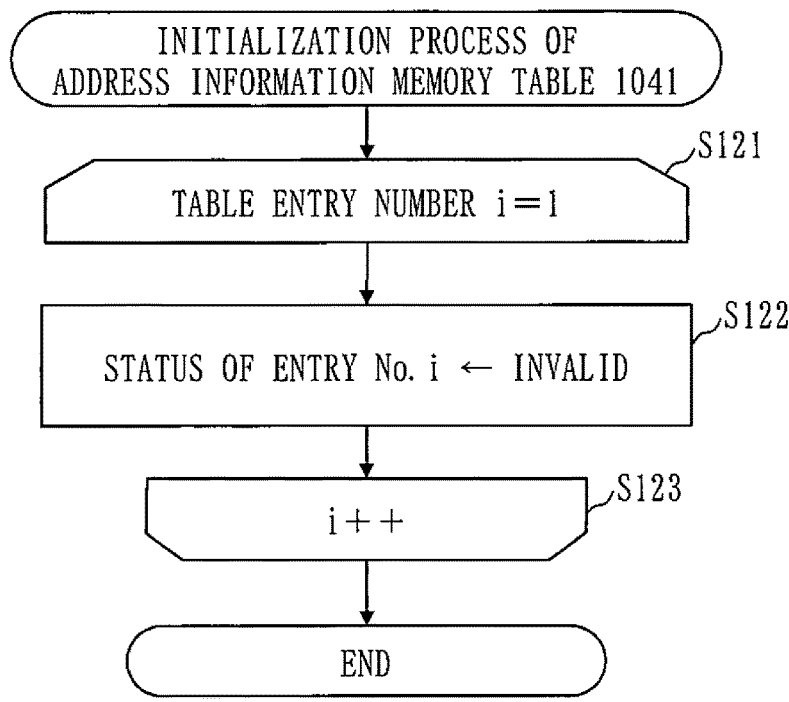
FIG. 14 is a flowchart of an initialization process of the address information memory table 1041 according to Embodiment 1.

FIG. 14 is a flowchart of an initialization process of the table 1041.

Figure 15:
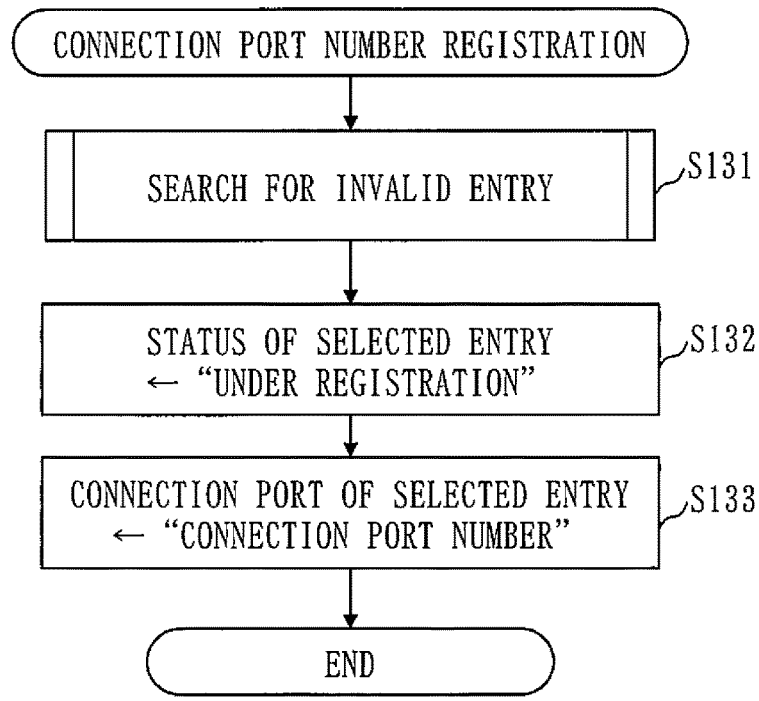
FIG. 15 is a flowchart of a connection port number registration process according to Embodiment 1.

FIG. 15 is a flowchart of a connection port number registration process.

Figure 16:
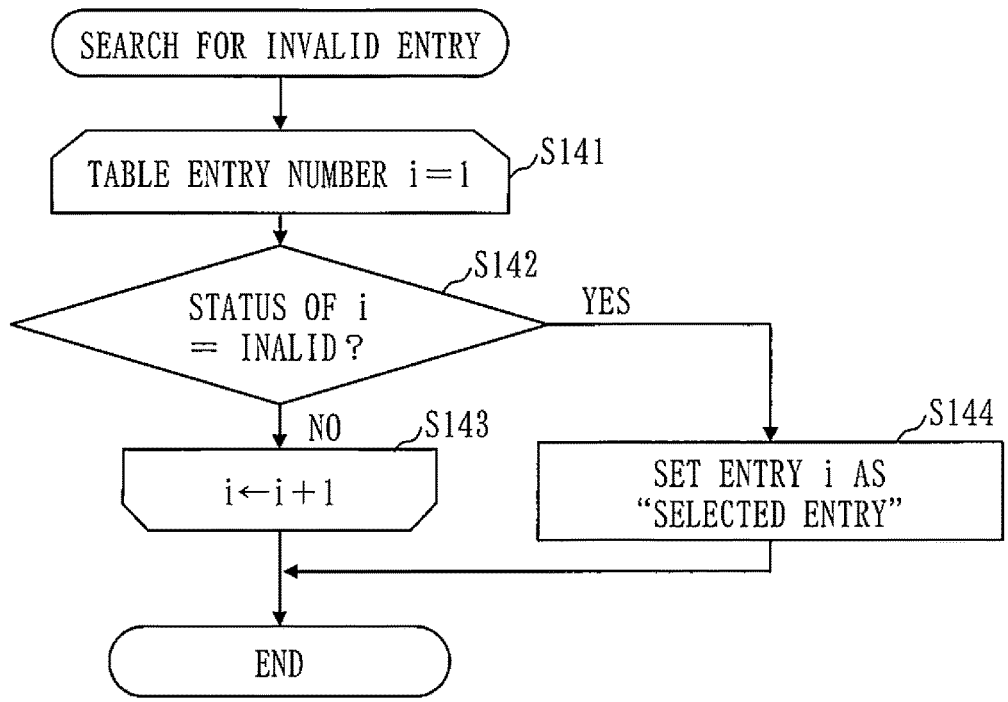
FIG. 16 is a flowchart of an invalid entry search process according to Embodiment 1.

FIG. 16 is a flowchart of an invalid entry search process.

Figure 17:
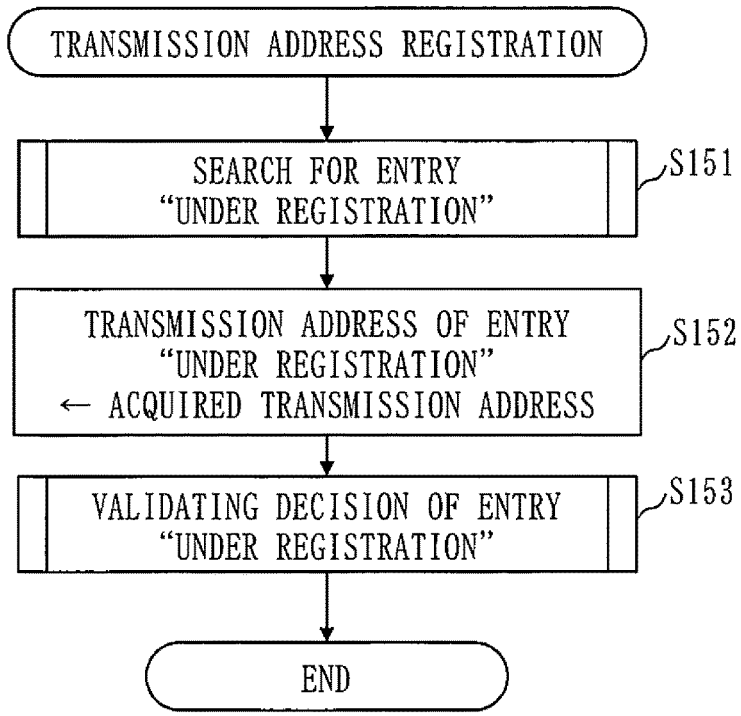
FIG. 17 is a flowchart of a transmission address registration process according to Embodiment 1.

FIG. 17 is a flowchart of a transmission address registration process.

Figure 18:
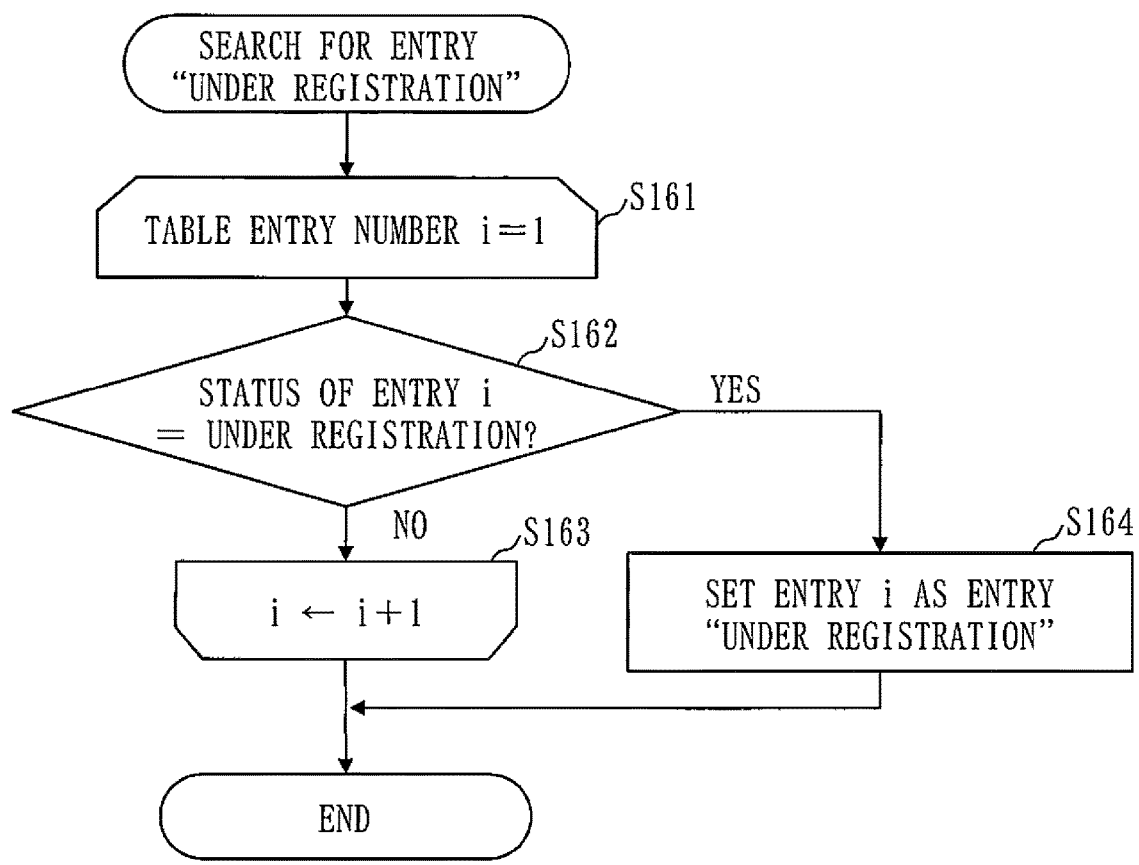
FIG. 18 is a flowchart of an "entry under registration" search process according to Embodiment 1.

FIG. 18 is a flowchart of an "entry under registration" search process.

Figure 19:
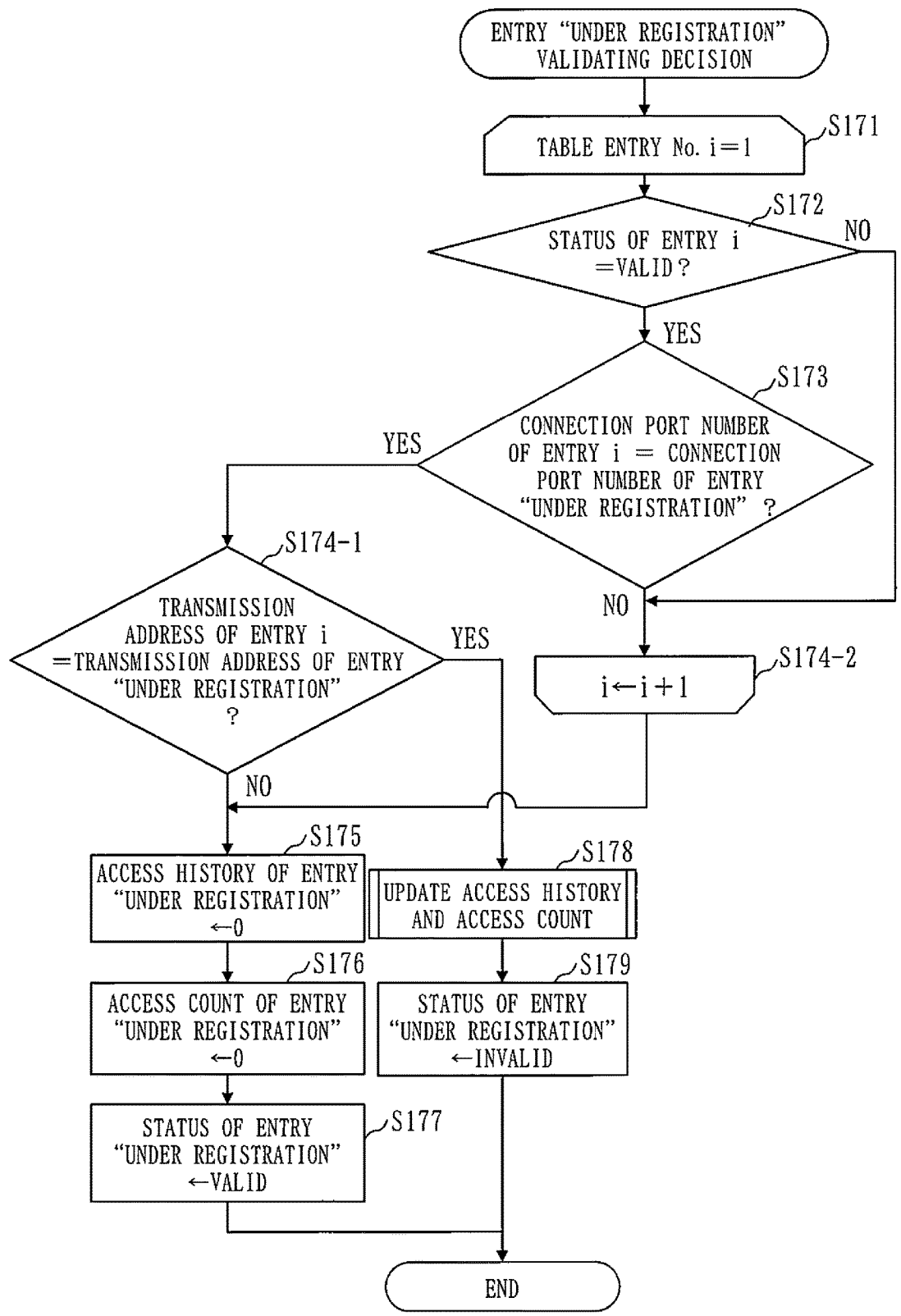
FIG. 19 is a flowchart of an "entry under registration" validating decision process according to Embodiment 1.

FIG. 19 is a flowchart of an "entry under registration" validating decision process.

Figure 20:
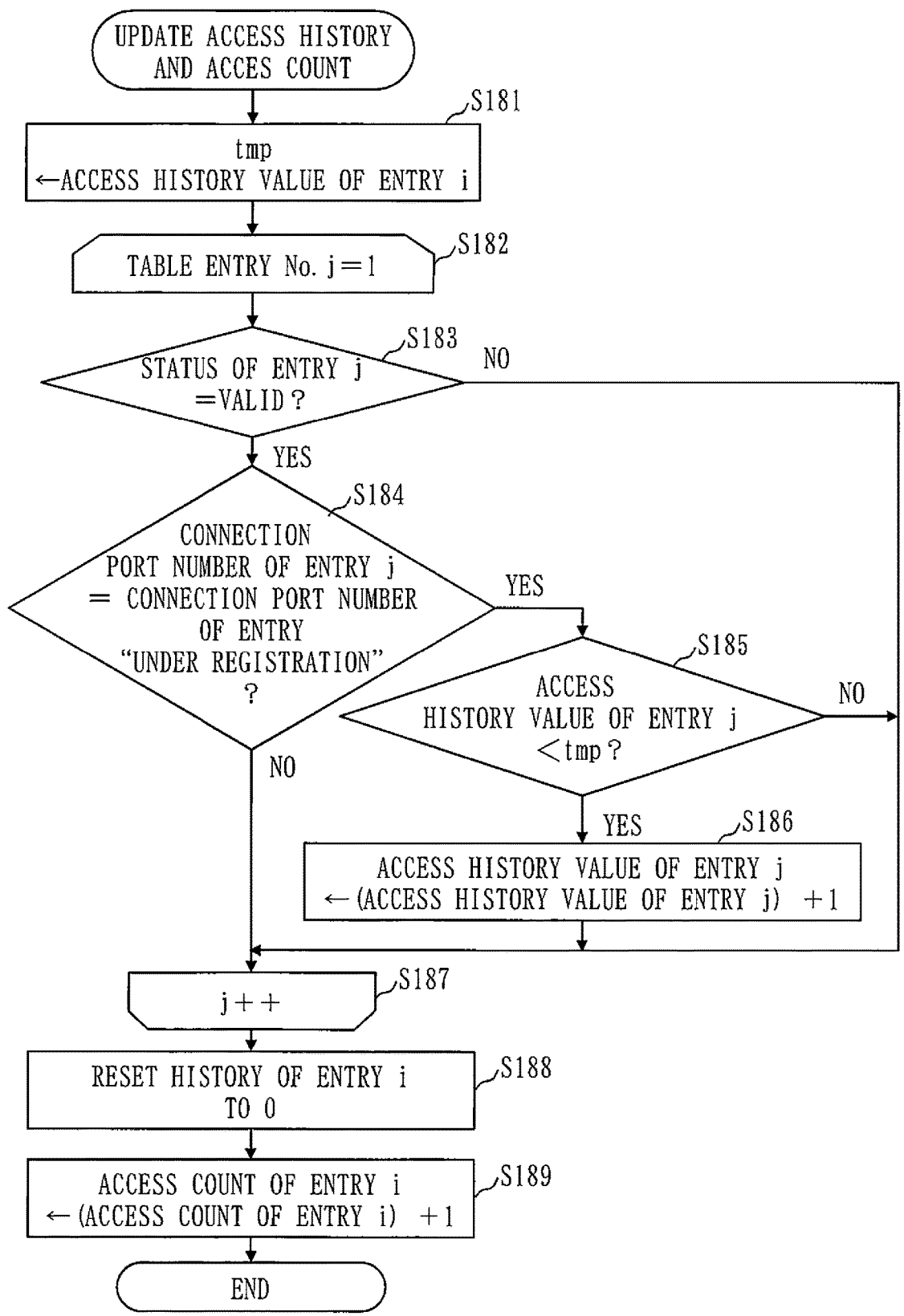
FIG. 20 is a flowchart of an update process of an access history and access count of the address information memory table 1041 according to Embodiment 1.

FIG. 20 is a flowchart of an update process of an access history and access count of the table 1041.

<F. 1 Initialization of Table 1041 (S112)>

(1) As illustrated in FIG. 13, after system reset is canceled (S111), the address memory part 104 invalidates the status of the table by initializing the table 1041 immediately after the system is started. (S112).

FIG. 14 illustrates the content of S112. In S121 to S123, the address memory part 104 invalidates the status of an entry i of the table 1041. If explaining this with reference to FIG. 5, the address memory part 104 invalidates the status of each entry (each row) of the table 1041.

<F. 2 Registration of Connection Port Number (S114)>

(1) In S113, the address memory part 104 waits for receiving the connection port number. When having accepted the connection port number 153 from the interrupt notification receiving part 101 (YES in S113, (a7) of FIG. 8), the address memory part 104 stores the accepted connection port number to the connection port number storing area 1041-3 of the un-used (invalid) entry of the table 1041 (S114).

(2) At this time, the entry where the connection port number has been written is not valid (in use) yet but is in an under-registration status. The status is hence under registration. S114 is illustrated in FIG. 15, and S131 of FIG. 15 is illustrated FIG. 16. In FIG. 16 illustrating S131, the address memory part 104 searches for an invalid entry in the table 1041. As indicated by S141 to S144 of FIG. 16, the address memory part 104 ends the process when it finds an invalid entry in the table 1041. The address memory part 104 changes the status of the hit invalid entry to "under registration" (S132), and stores the port number accepted in S113 to the connection port number storing area 1041-3 of the entry that is "under registration".

<F. 3 Registration (S116) of Transmission Address, Access History, and Access Count>

In S115, the address memory part 104 waits for receiving address information (ADR(1)). This corresponds to (c4-1) of FIG. 10.

(1)<Registration of Transmission Address>

When the address memory part 104 accepts the address information 155 outputted from the address selecting part 105 (YES in S115), the process of FIG. 13 advances to S116. The content of S116 is indicated by S151 to S153 of FIG. 17. S151 indicates search for an entry under registration. The content of S151 is illustrated in FIG. 18. The content of FIG. 18 is similar to the search for "invalid entry" described with reference to FIG. 16. When the address memory part 104 finds an "entry under registration" from the table 1041, the address memory part 104 maintains the initially found entry as "entry under registration" (S161 to S164). In S152, the address memory part 104 stores the address information (transmission address) received in S115 to the entry number storing area 1041-1 of the "entry under registration" found in S151. In S153, the address memory part 104 conducts validating decision of the entry under registration. S153 is indicated by S171 to S179 of FIG. 19. In the loop of S171 to S173 and S174-2, the address memory part 104 searches for a "valid" entry from the table 1041. When a "valid" entry is found in S172, then in S173, the address memory part 104 compares the connection port numbers of the "valid" entry and the "entry under registration" (S173). If the two numbers agree, the flow advances to S174-1. The address memory part 104 further determines whether or not the transmission addresses agree.

(2) <Case where Entries Having Same Transmission Address are Registered>

If agreement is obtained in S174-1, that is, if there already exists an entry having the connection port number of the entry under registration and the transmission address of above "F. 3(1)", the address memory part 104 does not store the transmission address but "invalidates" the under-registration status (S179 of FIG. 19). If agreement is obtained in S174-1, the process advances to S178, S179, and ends. These processes will be described in <F.4 Update of Access History and Access Count> later.

(3) <Case where Entries Having Same Transmission Addresses are not Registered>

If agreement is not obtained in S174-1, the process advances to S175, S176, S177, and ends. If agreement is not obtained in S174-1, a process to carry out is new registration of an entry having the same connection port number but a different transmission address. When storing the transmission address in above "F.3 (1)" and "F.3 (2)", the address memory part 104 sets the access history of the entry under registration to "0" (S175). Note that the access history is an integer of 0 or more. The smaller the value of the access history, the more recently the access has been made.

The access history indicates how recently the set of the connection port of a given entry and the transmission address has been used. The smaller the value of the access history, the more recently the set has been used.

(4) <Access Count of when Transmission Address is not Registered>

When storing the transmission address in above "F. 3(1)" and "F. 3(2)", the address memory part 104 sets the access count of the entry under registration to "0" (S177). The access count is an integer of 0 or more. The larger the value of the access count, the more frequently the access occurs.

<F.4 Update of Access History and Access Count>

(1) In the case of above "F. 3(2)", the address memory part 104 updates the access count of the already existing entry. The process takes place in the order of S174-1, S178, and S179. The content of S178 is illustrated in FIG. 20.

(2) Update of the access history is performed for every entry in a valid state whose connection port number agrees with the connection port number of an entry under registration. This will be described later with reference to FIG. 20.

(3) As illustrated in FIG. 20, in S178 of above "F. 3(2)", the address memory part 104 increments the access history of, among entries j being the access history update target, an entry j, the value of the access history of the entry j being smaller than a value tmp of the access history of an entry i whose transmission address agrees, by "+1". The address memory part 104 then updates the access history of an entry i whose transmission address agrees, to "0". As a result, the mutual size relation of the address histories can be maintained.

(4) As illustrated in FIG. 20, the access count of the already existing entry is updated by incrementing the value of the current access count value by +1.

FIG. 20 will be explained.

(1) In S181, the address memory part 104 stores the access history value of an entry i to a variable tmp. The access history value is the value of the entry i in the access history storing area 1041-5 of the table 1041. The entry i is a specific entry whose connection port number and transmission address are the same as those of the "entry under registration" in FIG. 19.

(2) In S182, the address memory part 104 selects one entry (j=1) from the table 1041.

(3) In S183, address memory part 104 decides whether or not the entry j is valid. If not valid, the address memory part 104 selects the next entry. If valid, the process advances to S184.

(4) In S184, the address memory part 104 decides whether or not the connection port number of the selected entry j and the connection port number of an entry i are the same. If different, the address memory part 104 selects the next entry, and repeats the process since S183. If the connection port numbers are the same (YES in S184), the process advances to S185.

(5) In S185, the address memory part 104 decides whether or not the access history value of the entry j is smaller than tmp. If not smaller than tmp, the process returns to S182. If smaller than tmp, the process advances to S186.

(6) In S186, the address memory part 104 increments the access history value of the entry j by 1. After that, the address memory part 104 selects another entry j, and the process returns to S182.

(7) In S188, the address memory part 104 resets the access history value of the entry i to "0".

(8) In S189, the address memory part 104 increments the access count of the entry i by 1.

<BG. Operation of Address Memory Part 108>

The operation of the address memory part 108 will be summarized as follows.

Figure 21:
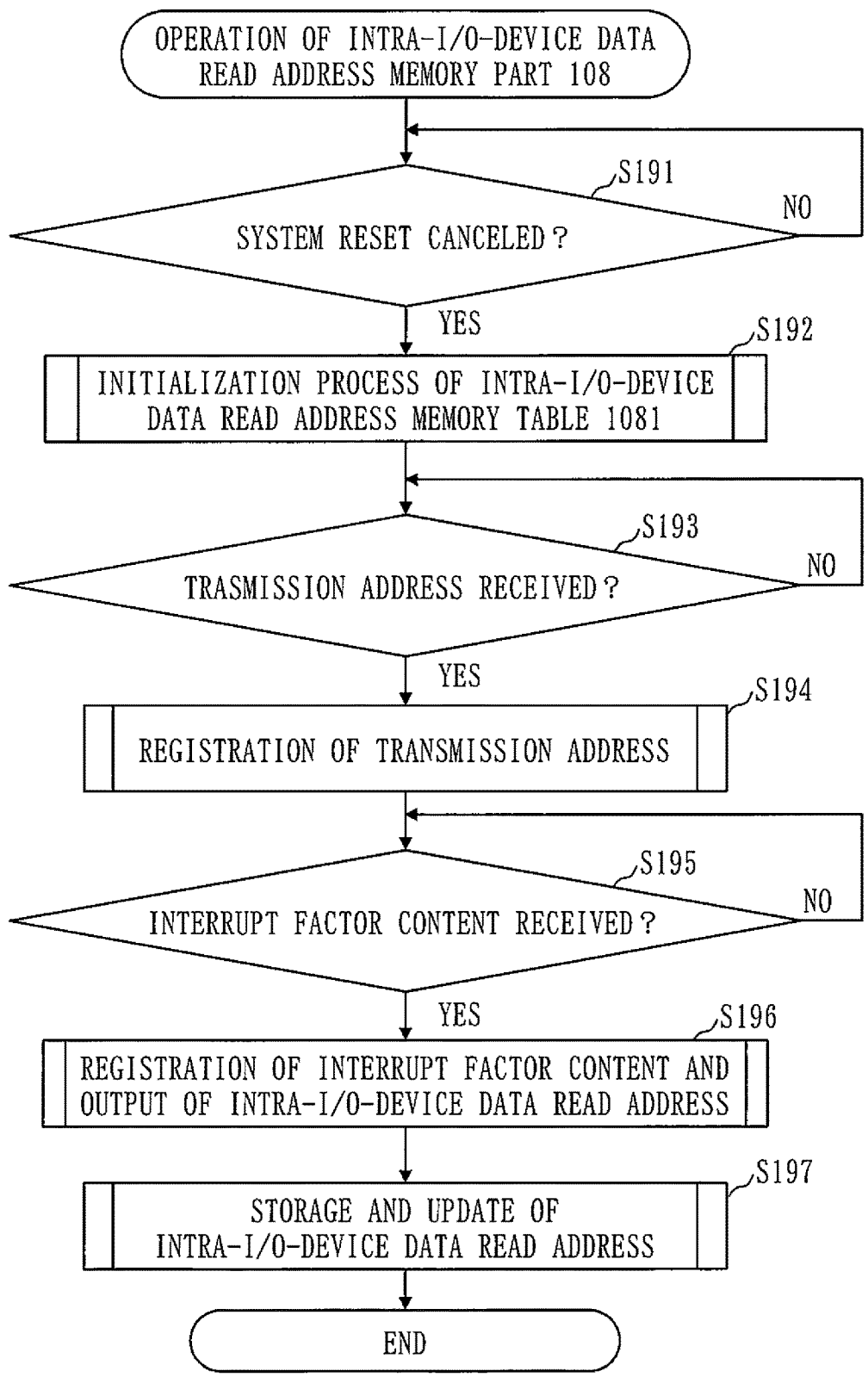
FIG. 21 is a flowchart of the operation of the intra-I/O-device data read address memory part 108 according to Embodiment 1.

FIG. 21 is a flowchart of the entire operation of the address memory part 108. The subject of the operation of FIG. 21 is the address memory part 108. FIGS. 22 to 26 illustrate a subroutine process of FIG. 21.

Figure 22:
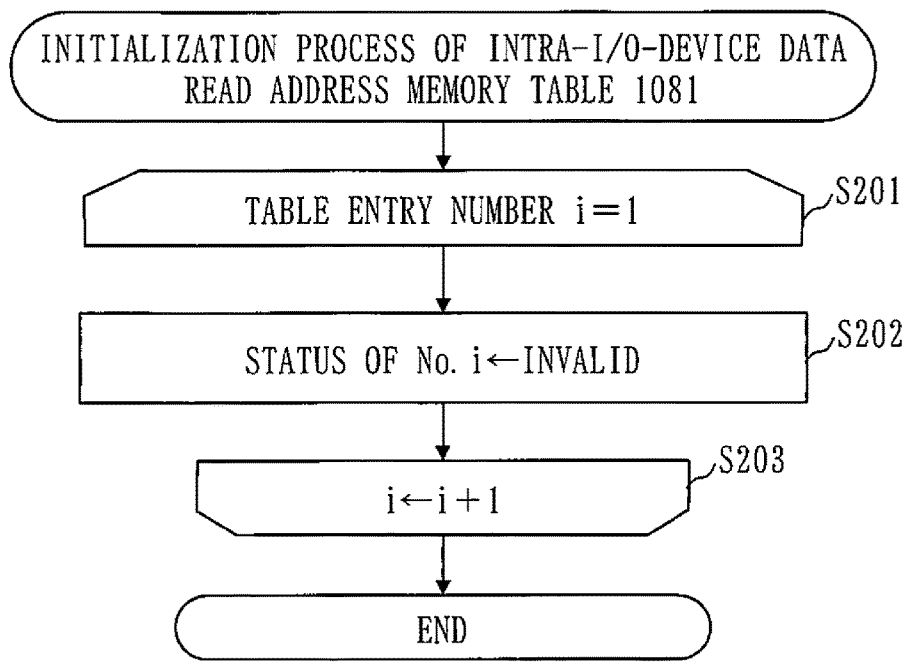
FIG. 22 is a flowchart of an initialization process of the intra-I/O-device data read address memory table 1081 according to Embodiment 1.

FIG. 22 is a flowchart of an initialization process of the table 1081.

Figure 23:
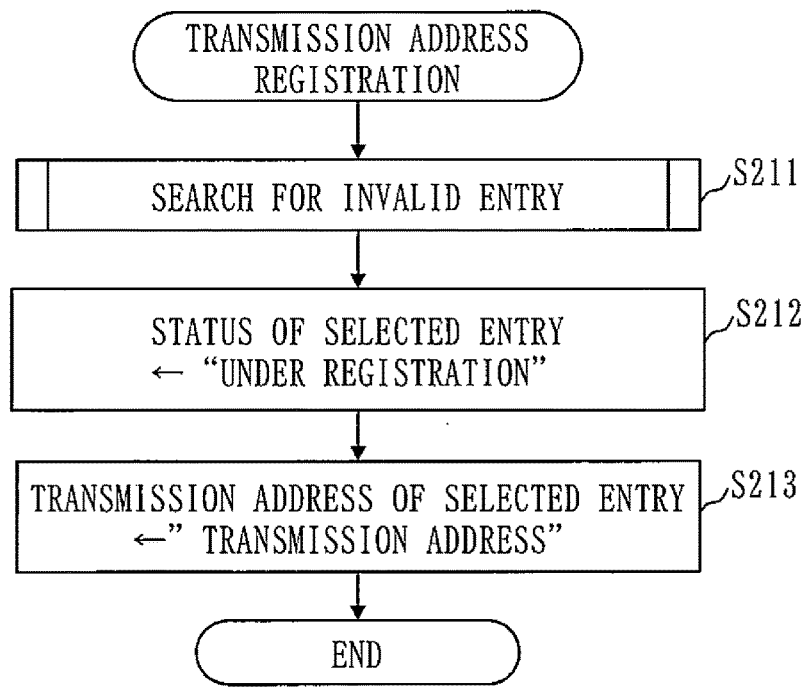
FIG. 23 is a flowchart of a registration process of a transmission address to the intra-I/O-device data read address memory table 1081 according to Embodiment 1.

FIG. 23 is a flowchart of a process of registering the transmission address to the table 1081.

Figure 24:
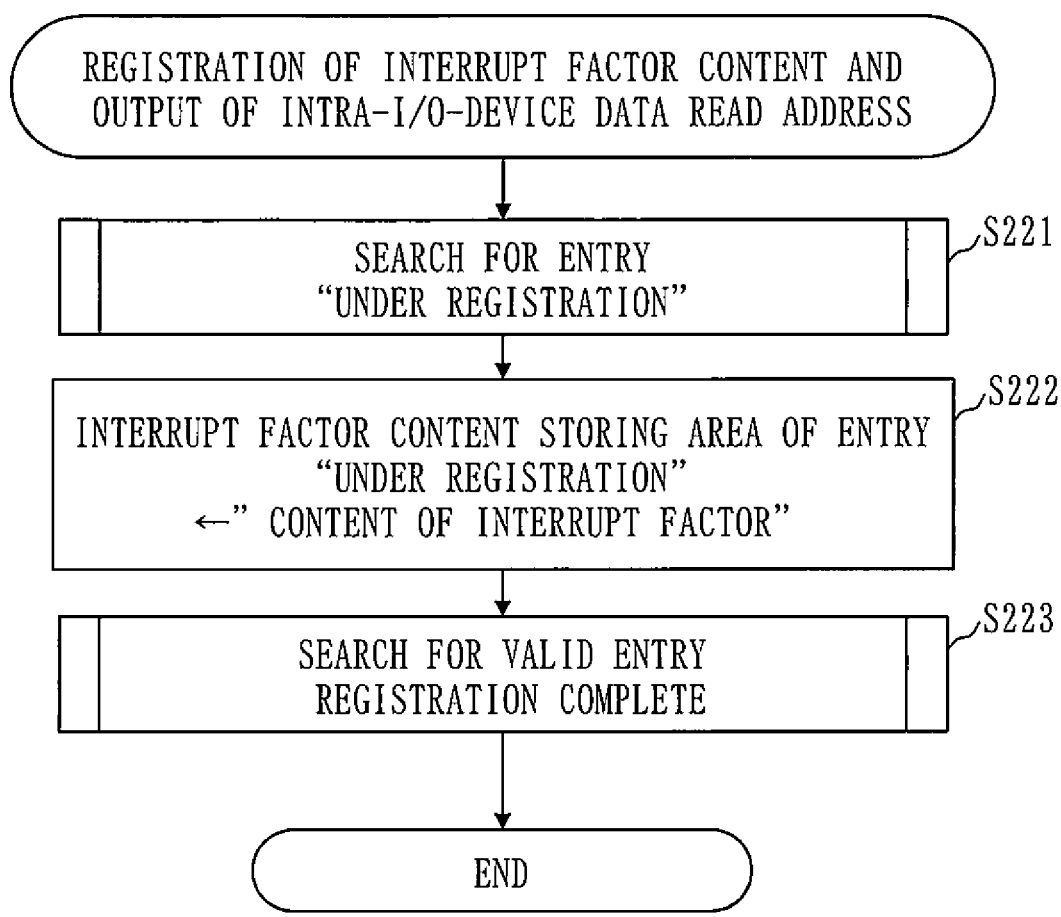
FIG. 24 is a flowchart of registration of an interrupt factor content and output of an intra-I/O-device data read address, of the intra-I/O-device data read address memory table 1081 according to Embodiment 1.

FIG. 24 is a flowchart of registration of an interrupt factor content and output of a data read address, of the table 1081.

Figure 25:
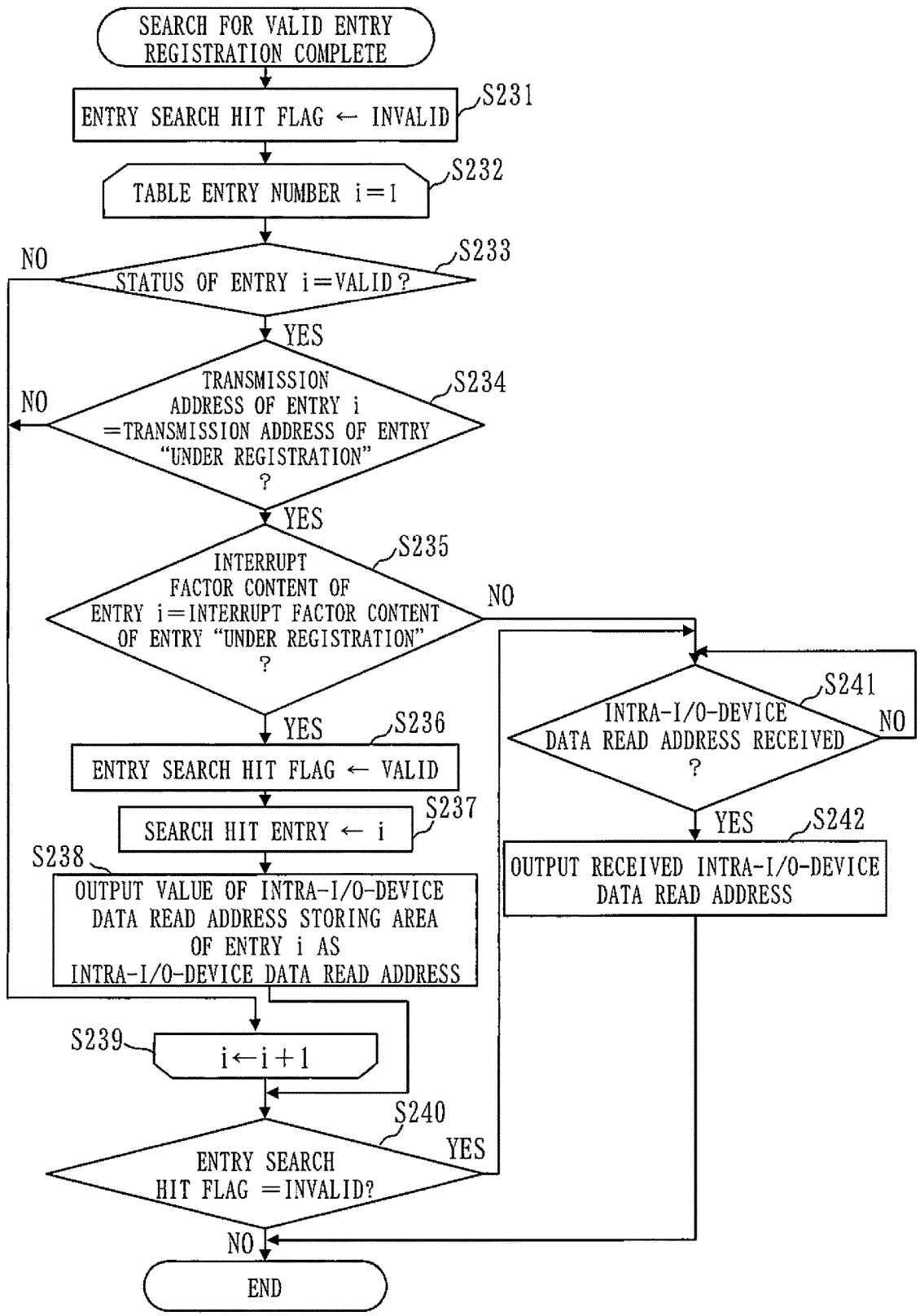
FIG. 25 is a flowchart of a search process of a valid entry registration complete according to Embodiment 1.

FIG. 25 is a flowchart of a search process of a registered valid entry.

Figure 26:
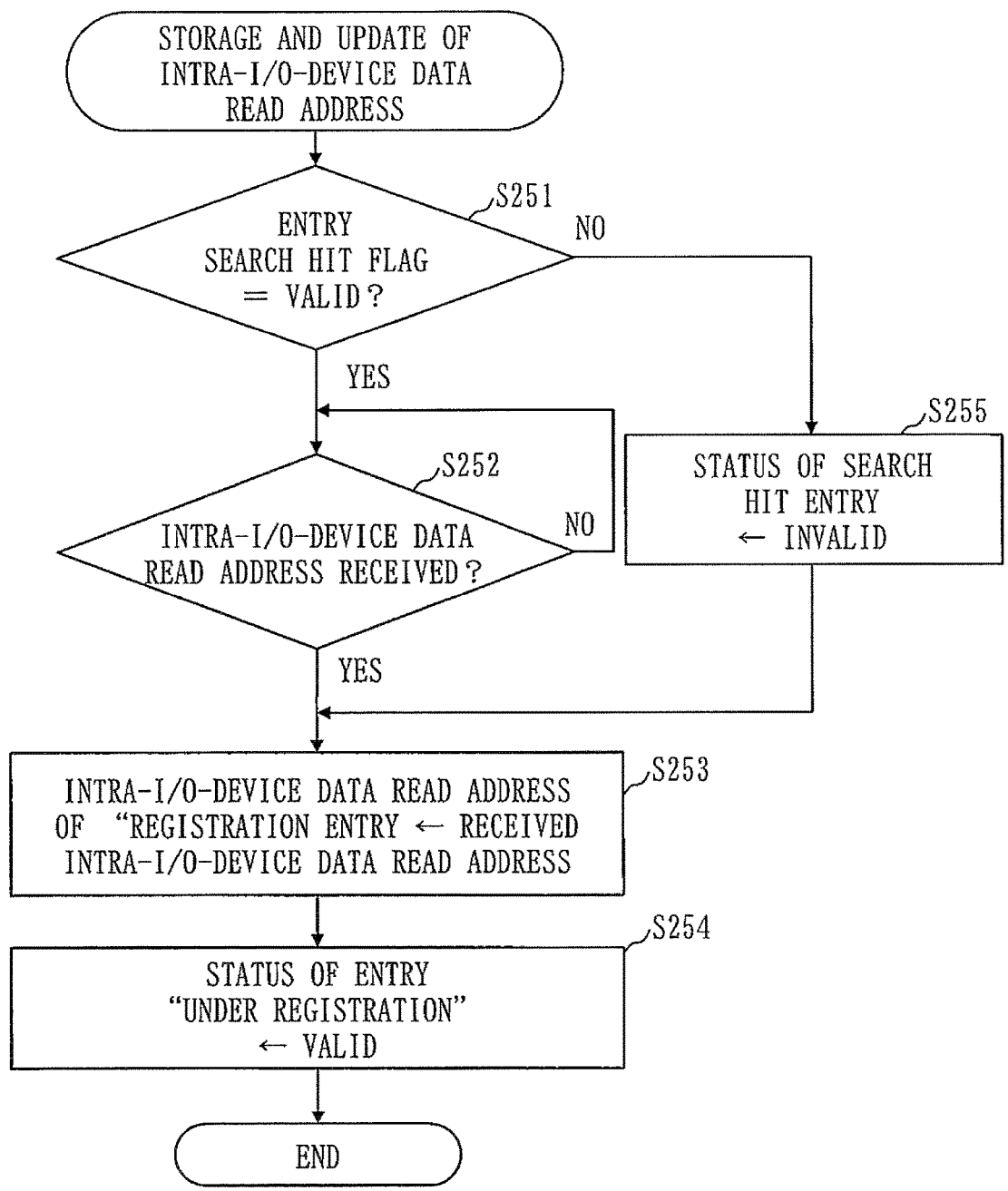
FIG. 26 is a flowchart of a storing process and update process of an intra-I/O-device data read address according to Embodiment 1.

FIG. 26 is a flowchart of a storing process and update process of the data read address.

As illustrated in FIG. 21, after the system reset is canceled (S191), the address memory part 108 invalidates the status of the table by initializing the table 1081 immediately after the system is started (S192). The content of S192 is illustrated in FIG. 22. FIG. 22 is identical with FIG. 14 and its explanation will accordingly be omitted.

<G. 1 Registration of Transmission Address: S194>

(1) In S193, the address memory part 108 waits for receiving the transmission address. When having accepted the transmission address 156 from the address selecting part 105 ((a11) of FIG. 8), the address memory part 108 stores the accepted transmission address to the transmission address storing area of the un-used (invalid) entry of the table 1081.

(2) At this time, the entry where the transmission address has been written is not valid (in use) yet but is in an under-registration status. The status is hence under registration. The transmission address registration (S194) is illustrated in FIG. 23. S211 of FIG. 23 is illustrated in FIG. 16 and has been described previously. The explanation of S211 will accordingly be omitted. FIG. 23 is similar to FIG. 15 and its explanation will accordingly be omitted.

<G. 2 Registration of Interrupt Factor Content and Output of Data Read Address>

(1) In S195, the address memory part 108 waits for receiving the interrupt factor content. When having accepted the interrupt factor content 161 from the I/O-side receiving part 107 (YES in S195, (b5) of FIG. 9), the process advances to S196. S196 corresponds to the content of FIG. 24. S221 of FIG. 24 corresponds to the content of FIG. 18, and S223 corresponds to the content of FIG. 25. As FIG. 18 has previously been described, the explanation on S221 will be omitted. In S222, the address memory part 108 stores the accepted interrupt factor content 161 to the interrupt factor content storing area 1081-4 of the entry "under registration" of the table 1081. The process then advances to S223.

(2) An explanation will be made hereinafter with reference to FIG. 25. The address memory part 108 invalidates the entry search hit flag (S231) and selects one entry from the table 1081 (S232). If the selected entry i is valid, the address memory part 108 advances to the process of S234; if not valid, selects the next entry (S233). When having accepted the interrupt factor content 161 from the I/O-side receiving part 107 ((b5) of FIG. 9), the address memory part 108 confirms whether the combination of the transmission address of the entry under registration and the accepted interrupt factor content 161, of the table 1081 exists among entries in an already valid status (S234, S235). If this combination exists (YES in S234, YES in S235), the address memory part 108 validates the entry search hit flag (S236). The address memory part 108 stores "i" of the entry i to the "search hit entry" (S237). The address memory part 108 outputs the value of the data read address storing area of the entry i of the valid status to the I/O-side transmitting part 106 as the data read address 162 (S238). If the entry search hit flag is not invalid (NO in S240), the address memory part 108 ends the process.

(3) When the interrupt factor content 161 is accepted from the I/O-side receiving part 107 in (b5) of FIG. 9, if the combination of the transmission address of the entry under registration (YES in F193) and the accepted interrupt factor content 161 (YES in S195), of the table 1081 does not exist among the entries in the valid status (NO in S235, YES in S240), the process advances to S241. In S241, the address memory part 108 waits for accepting the data read address 158 outputted by the CPU-side receiving part 103. In S241, when having accepted the data read address 158 ((d3) of FIG. 11), the address memory part 108 outputs the data read address 158 to the I/O-side transmitting part 106 as the data read address 162 (S242, (d5) of FIG. 11).

<G. 3 Storage and Update of Data Read Address>

As illustrated in FIG. 21, after S196, the process advances to S197. S197 corresponds to the content of FIG. 26.

(1) When the entry search hit flag is valid (YES in S251), the address memory part 108 waits for receiving the data read address (S252). When having accepted the data read address 158 outputted by the CPU-side receiving part 103 (YES in S252, (d3) of FIG. 11), the address memory part 108 stores the data read address 158 to the data read address storing area 1081-5 of the entry under registration of the table 1081 (S253), and validates the status of the entry under registration (S254).

(2) In the case of "G. 2 Registration of Interrupt Factor Content and Output of Data Read Address (2)" described above (YES in S251, already registered in the entry), the address memory part 108 invalidates the valid entry i whose transmission address and interrupt factor agree with the transmission address and the accepted interrupt factor of the entry under registration. As a result, the table 1081 is updated with the latest data read address 158.

With Embodiment 1 described above, the following effects can be obtained.

(1) By making it unnecessary to set an address indicating the storing location of the "interrupt factor" in advance and making it unnecessary to change the software process used formerly before the conventional method of shortening the time necessary for reading the "interrupt factor" is employed, the time necessary for reading the "interrupt factor" can be reduced.

(2) An effect of reducing the time can be obtained regarding infra-I/O-device data reading which occurs in a process after interrupt factor reading.

(3) The effect of reducing the time mentioned above can also be obtained in a multistage bus configuration where bus relaying devices are connected in a multistage manner.

The above embodiment has described a bus relaying device which is used in a system configuration including the following (1) to (4).

(1) Software processes are periodically, repeatedly executed.

(2) The CPU completes a software process within a predetermined period and executes a software process again in the next period.

(3) A plurality of I/O devices are connected, and the CPU and the plurality of I/O devices are connected via the bus relaying device.

(4) The I/O device and the bus relaying device are connected in one to one (point to point).

The bus relaying device described in the above embodiment includes the following constituent elements: the interrupt notification receiving part 101, the interrupt notification transmitting part 102, the CPU-side receiving part 103, the address memory part 104, the address selecting part 105, the I/O-side transmitting part 106, the I/O-side receiving part 107, the address memory part 108, the interrupt factor content memory part 109, the transaction transmitting part 110, and the data memory part 111.

The bus relaying device described in the above embodiment also includes the following configuration.

(1) The interrupt notification is received from the I/O device and transferred to the CPU.

(2) The interrupt factor read is issued to the I/O device autonomously without waiting for the interrupt factor read request from the CPU.

(3) Address setting at the time of the interrupt factor read to the I/O device need not be performed in a software manner. An active address is stored and used.

(4) A plurality of address can be stored, and an address that suits the status at the time of reading the interrupt factor to the I/O device can be selected.

(5) An interrupt factor obtained by the interrupt factor read issued to the I/O device autonomously is stored.

(6) When the interrupt factor read request from the CPU is received, the interrupt factor stored in the own bus relaying device is sent to the CPU.

(7) An address is extracted from the interrupt factor read request sent from the CPU and is stored as a candidate address of the next autonomous interrupt factor read. Statistic information is created and stored as well.

The bus relaying device described in the above embodiment has the following characteristic feature. More specifically, the bus relaying device described above can autonomously read from the I/O device the intra-I/O-device data that has been read by the CPU by the interrupt factor received from the I/O device, after the interrupt factor is read, without waiting for the intra-I/O-device data being read from the CPU.

The bus relaying device described in the above embodiment has the following characteristic feature. More specifically, the bus relaying device described above can be connected in place of the I/O device, enabling multistage connection of the bus relaying devices.

REFERENCE SIGNS LIST

1: bus relaying device; 2, 3: system; 10: CPU; 11: bus; 12: I/O device; 101: interrupt notification receiving part; 102: interrupt notification transmitting part; 103: CPU-side receiving part; 104: address memory part 1041: table; 105: address selecting part; 106: I/O-side transmitting part; 107: I/O-side receiving part; 108: address memory part 1081: table; 109: interrupt factor content memory part; 110: transaction transmitting part; 111: data memory part; 151: interrupt notification; 152: interrupt notification reception flag; 153: connection port number; 154: address look-up instruction; 155: address information; 156: transmission address; 157: interrupt factor read instruction; 158: data read address; 159: read request (interrupt factor read request, intra-I/O-device data read request); 160: read data; 161: interrupt factor content; 162: data read address; 163: intra-I/O-device data

The invention claimed is:

1. A bus relaying device to relay interrupt information communicated between a CPU (Central Processing Unit) and an I/O (input/Output) device, an upper-order side of the bus relaying device being connected to either the CPU or another relaying device, a lower-order side of the bus relaying device being connected to at least the I/O device, out of the I/O device and still another relaying device different from the relaying device connected to the upper-order side, the bus relaying device comprising:

an interrupt notification receiving part to receive an interrupt notification from a lower-order-side port, and output a port number of the port, the interrupt notification having been sent by the I/O device;

a first address memory part to store interrupt factor address information including a plurality of sets each having a port number and an interrupt factor address being an address to be used for reading an interrupt factor;

an address selecting part to receive the port number outputted by the interrupt notification receiving part; acquire the interrupt factor address from the interrupt factor address information of the first address memory part based on the port number received; determine whether or not a device connected to a port of the port number received is the I/O device based on connection information held in advance; and when having determined that the device connected to the port is the I/O device, output the interrupt factor address acquired from the first address memory part;

a lower-order-side transmitting part to transmit a factor read request for the interrupt factor, the factor read request including the interrupt factor address outputted by the address selecting part, to the I/O device connected to the port;

a lower-order-side receiving part to receive the interrupt factor from the I/O device connected to the port, and output the interrupt factor received, the interrupt factor responding to the factor read request for the interrupt factor, the factor read request being transmitted by the lower-order-side transmitting part; and a second address memory part to store a plurality of sets each having an interrupt factor address, an interrupt factor, and a data read address being an address used for reading internal data of the I/O device; receive the interrupt factor address outputted by the address selecting part and the interrupt factor outputted by the lower-order-side receiving part; determine whether or not a set including the interrupt factor address received and the interrupt factor received exists among the plurality of sets stored; and when having determined that the set including the interrupt factor address received and the interrupt factor received exists, output the data read address included in the set, wherein the lower-order-side transmitting part creates a data read request requesting read of the internal data of the I/O device based on the data read address outputted by the second address memory part, and transmits the data read request created, to the I/O device connected to the port.

2. The bus relaying device according to claim 1, further comprising:

an upper-order-side receiving part to receive a factor read request for an interrupt factor, the factor read request including an interrupt factor address, from the device connected to the upper-order side; when having received the factor read request, determine whether or not the device connected to the upper-order side is a CPU based on connection information held in advance; and when having determined that the CPU is connected to the upper-order side, output a read instruction for the interrupt factor;

an interrupt factor memory part to receive the read instruction for the interrupt factor, the read instruction being outputted by the upper-order-side receiving part; receive and store the interrupt factor outputted by the lower-order-side receiving part; and when the interrupt factor is stored and the read instruction for the interrupt factor is received, output the interrupt factor; and an upper-order-side transmitting part to receive the interrupt factor outputted by the interrupt factor memory part, and transmit the interrupt factor received, to the CPU connected to the upper-order side.

3. The bus relaying device according to claim 2, further comprising an internal data memory part to store the internal data of the I/O device, wherein the upper-order-side receiving part receives a data read request including a data read address and requesting read of the internal data of the I/O device, from the device connected to the upper-order side, extracts the data read address from the data read request received, and outputs the data read address extracted, wherein the internal data memory part receives the data read address outputted by the upper-order-side receiving part; when having received the data read address from the upper-order-side receiving part, determines whether or not the device connected to the upper-order side is the CPU based on connection information held in advance; and when having determined that the CPU is connected to the upper-order side, outputs the internal data to the upper-order-side transmitting part, if the internal data of the I/O data is stored, and wherein the upper-order-side transmitting part receives the internal data from the internal data memory part, and transmits the internal data to the CPU connected to the upper-order side.

4. The bus relaying device according to claim 3, wherein the lower-order-side receiving part receives the internal data of the I/O device from the device connected to the lower-order side, and outputs the internal data received, to the internal data memory part, and wherein the internal data memory part, when having received the internal data from the lower-order-side receiving part, determines whether or not the device connected to the upper-order side is the CPU based on the connection information held in advance; when having determined that the CPU is connected to the upper-order side, transmits the internal data to the upper-order-side transmitting part if the data read address outputted by the upper-order-side receiving part has already been received, and waits for the data read address to be received if the data read address has not been received yet; and when the data read address is received, transmits the internal data to the upper-order-side transmitting part.

5. The bus relaying device according to claim 2, wherein the interrupt factor address information stored by the first address memory part has access information indicating a past using situation of each set where the port number was used in the set, wherein the upper-order-side receiving part, when having received a factor read request for an interrupt factor, the factor read request including an interrupt factor address, from the device connected to the upper-order side, extracts the interrupt factor address from the factor read request, and outputs the interrupt factor address extracted, wherein the first address memory part receives the port number outputted by the interrupt notification receiving part and the interrupt factor address outputted by the upper-order-side receiving part, and updates the access information for the set including the same port number and the same interrupt factor address as the port number received and the interrupt factor address received, and wherein the address selecting part acquires the interrupt factor from the interrupt factor address information that has been updated, of the access information.

6. The bus relaying device according to claim 5, wherein the interrupt factor address information stored by the first address memory part includes, as the access information for each set, an access history indicating how recent the set has been used, and an access count indicating a count of times the set has been used, and wherein the address selecting part acquires the interrupt factor address based on either one of the access history and the access count.

7. The bus relaying device according to claim 5, wherein the interrupt factor address memory part, when having received the port number outputted by the interrupt notification receiving part and the interrupt factor address outputted by the upper-order-side receiving part, if the set including the same port number and the same interrupt factor address as the port number received and the interrupt factor address received does not exist, stores a set including the port number received and the interrupt factor address received, as a new set.

8. The bus relaying device according to claim 3, wherein the second address memory part receives the interrupt factor address outputted by the address selecting part, the interrupt factor outputted by the lower-order-side receiving part, and the data read address outputted by the upper-order-side receiving part; determines whether or not a set having the interrupt factor address received, the interrupt factor received, and the data read address received has been stored; and when having determined that the set has not been stored, stores the set anew.

* * * * *